US008654383B2

(12) United States Patent
Sugimoto

(10) Patent No.: US 8,654,383 B2
(45) Date of Patent: Feb. 18, 2014

(54) INFORMATION PROCESSING SYSTEM, APPARATUS, METHOD AND NON-TRANSITORY COMPUTER-READABLE RECORDING MEDIUM FOR GENERATING A DISPLAY SCREEN BASED ON LOCAL ERROR DISPLAY INFORMATION AND REMOTE STYLE SHEET INFORMATION

(75) Inventor: Tetsuya Sugimoto, Muko (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 195 days.

(21) Appl. No.: 13/045,251

(22) Filed: Mar. 10, 2011

(65) Prior Publication Data
US 2011/0228328 A1 Sep. 22, 2011

(30) Foreign Application Priority Data
Mar. 17, 2010 (JP) ................................. 2010-060649

(51) Int. Cl.
G06F 3/12 (2006.01)
G06K 15/00 (2006.01)
G06F 11/00 (2006.01)
G03G 15/00 (2006.01)
G08B 21/00 (2006.01)

(52) U.S. Cl.
USPC .......... 358/1.15; 358/1.13; 358/1.14; 399/81; 340/540; 714/48

(58) Field of Classification Search
USPC .......... 358/1.13, 1.14, 1.15; 399/81; 340/540; 714/48
See application file for complete search history.

(56) References Cited

U.S. PATENT DOCUMENTS 7,319,388 B2  1/2008 Ichinowatari
7,920,101 B2  4/2011 Lum et al.
(Continued)

FOREIGN PATENT DOCUMENTS

EP   2 107 719      10/2009
JP   2002-247274    8/2002
(Continued)

OTHER PUBLICATIONS

Japanese Notice of Ground for Rejection mailed Dec. 27, 2011, directed to Japanese Application No. 2010-060649; 7 pages.
Extended Search Report dated Jun. 5, 2013, directed to European Patent Application No. 11157640.1; 8 pages.

Primary Examiner — Fred Guillermety
(74) Attorney, Agent, or Firm — Morrison & Foerster LLP

(57) ABSTRACT

An information processing apparatus can communicate with a server in which an application program is installed so as to be executable. The information processing apparatus includes a browsing portion to display a screen received from the server. If receiving from the server a setting screen for setting an execution condition for executing the application program, the browsing portion allows the server to execute the application program in accordance with the execution condition set in the setting screen. The information processing apparatus further includes a style sheet reception portion to receive a style sheet corresponding to the application program from the server, a process execution portion to execute a prescribed process, a display control portion, if the process execution portion produces display information to notify a user as a result of executing the prescribed process, to display a first display screen including the display information, and a screen generation portion to generate a second display screen based on the display information and the style sheet, if the display information is produced. While the screen received from the server is being displayed by the browsing portion, the display control portion displays the second display screen in place of the first display screen.

8 Claims, 13 Drawing Sheets

(56) References Cited

U.S. PATENT DOCUMENTS

| | | |
|---|---|---|
| 2002/0087915 A1* | 7/2002 | Perla et al. ............... 714/15 |
| 2006/0059462 A1* | 3/2006 | Yamamoto ............... 717/115 |
| 2006/0077444 A1* | 4/2006 | Lum et al. ............... 358/1.15 |
| 2008/0091800 A1 | 4/2008 | Sorrentino et al. |

FOREIGN PATENT DOCUMENTS

| | | |
|---|---|---|
| JP | 2006-91343 | 4/2006 |
| JP | 2006-135890 | 5/2006 |
| JP | 2007-87398 | 4/2007 |
| JP | 2009-238232 | 10/2009 |

* cited by examiner

F I G. 3
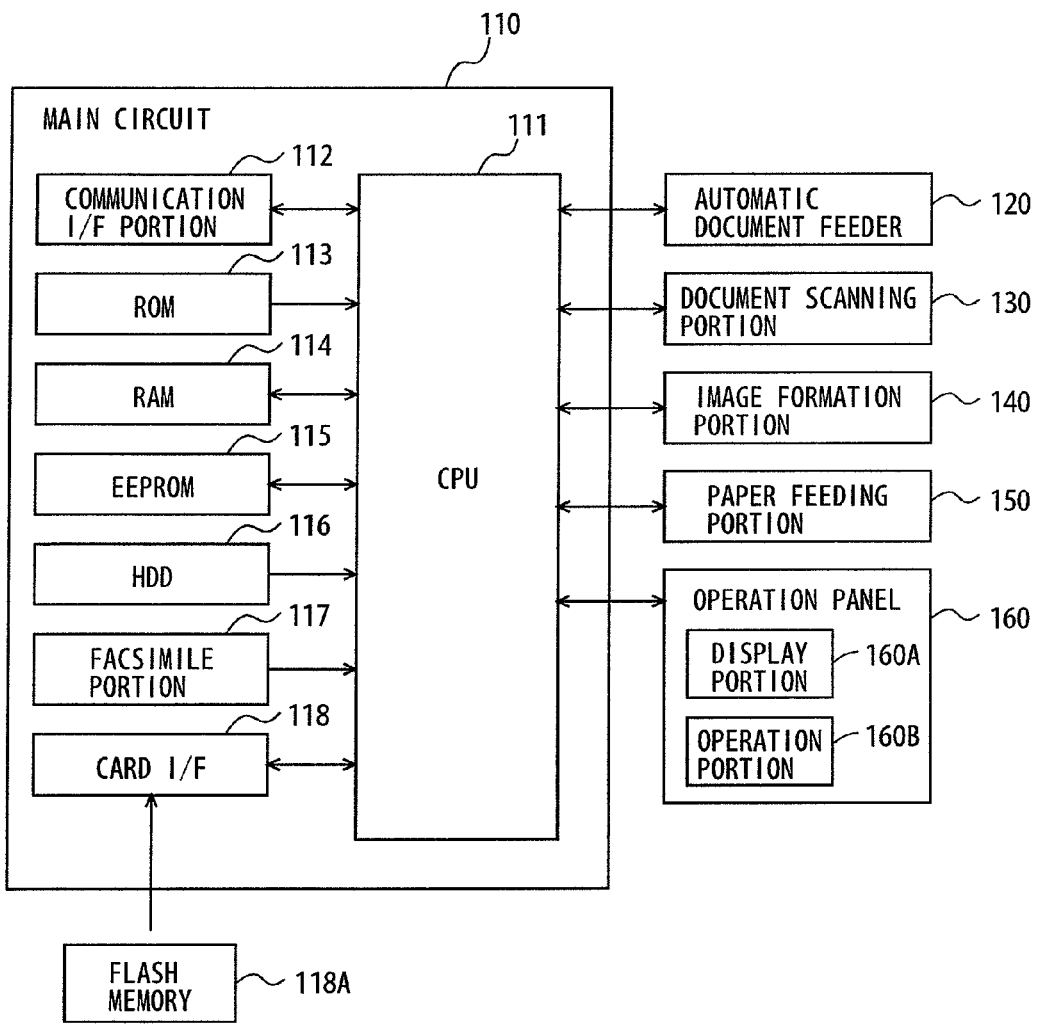

INFORMATION PROCESSING SYSTEM, APPARATUS, METHOD AND NON-TRANSITORY COMPUTER-READABLE RECORDING MEDIUM FOR GENERATING A DISPLAY SCREEN BASED ON LOCAL ERROR DISPLAY INFORMATION AND REMOTE STYLE SHEET INFORMATION

This application is based on Japanese Patent Application No. 2010-060649 filed with Japan Patent Office on Mar. 17, 2010, the entire content of which is hereby incorporated by reference.

BACKGROUND OF THE INVENTION

1. Field of the Invention

The present invention relates to an information processing system, an information processing apparatus, a cooperative job execution method, and a non-transitory computer-readable recording medium encoded with a cooperative job execution program. More particularly, the present invention relates to an information processing system in which an information processing apparatus causes a server installed with an application program to execute the application program, the information processing apparatus, a cooperative job execution method executed in the information processing apparatus, and a non-transitory computer-readable recording medium encoded with a cooperative job execution program.

2. Description of the Related Art

Multi Function Peripheral (hereinafter referred to as "MFP") can perform a variety of functions. A system is known which causes a server installed with an application program to execute a process, rather than executing the process in MFP. In a system of this kind, for example, a setting screen for setting the conditions on which the server executes an application program is transmitted from the server and displayed on the operation panel of MFP. On the other hand, MFP can execute another process such as print while the setting screen transmitted from the server executing the application program is being displayed. If an event, for example, paper-out, of which the user has to be notified, occurs as a result of execution of another process by MFP, a screen displaying an error message appears on the operation panel.

The setting screen transmitted from the server and the screen displaying an error message are of different designs. Therefore, if the screen displaying an error message appears while the setting screen transmitted from the server is being displayed, the display switches to the screen of a different design, making the user feel strange.

Japanese Patent Laid-Open No. 2006-91343 discloses an image processor having a control panel with a display function and performing device operation and external access using the control panel. The image processor includes a control panel operating status judgment unit which judges whether the operating status of the control panel is a device operation status or an external access status, an abnormality detection unit which detects the abnormality of the device, a reporting mode select unit which selects a reporting mode of a device abnormality when the device abnormality is detected by the abnormality detection unit, according to the operating status of the control panel judged by the control panel operating status judgment unit and the type of device abnormality detected by the abnormality detection unit, and a reporting unit which reports the device abnormality detected by the abnormality detection unit in the reporting mode selected by the reporting mode select unit. The reporting mode includes displaying an icon for indicating the device abnormality, displaying a popup screen to indicate the device abnormality, and displaying an abnormality display area including a request button for display of the type of the device abnormality and the detailed display thereof.

However, in the conventional image processor, the displayed icon, popup screen, or abnormality display area is generated in the image processor. Therefore, the icon, popup screen, or abnormality display area is displayed in a design different from that of the screen displayed in the external access status.

SUMMARY OF THE INVENTION

In accordance with an aspect of the present invention, an information processing system includes a server in which an application program is installed so as to be executable and an information processing apparatus which can communicate with the server. The server transmits a setting screen for setting an execution condition for executing the application program in response to a request from the information processing apparatus, and executes the application program in accordance with the execution condition set in the setting screen in the information processing apparatus. The information processing apparatus includes an application registration portion to set to allow the server to execute the application program, a style sheet reception portion to receive a style sheet corresponding to the application program from the server, a browsing portion to display a screen received from the server, a process execution portion to execute a prescribed process, and a display control portion, if the process execution portion produces display information to notify a user as a result of executing the prescribed process, to display a first display screen including the display information. The display control portion includes a screen generation portion to generate a second display screen based on the display information and the style sheet, if the display information is produced, and displays the second display screen in place of the first display screen while the screen received from the server is being displayed by the browsing portion.

In accordance with another aspect of the present invention, an information processing apparatus can communicate with a server in which an application program is installed so as to be executable. The information processing apparatus includes a browsing portion to display a screen received from the server. If receiving from the server a setting screen for setting an execution condition for executing the application program, the browsing portion allows the server to execute the application program in accordance with the execution condition set in the setting screen. The information processing apparatus further includes a style sheet reception portion to receive a style sheet corresponding to the application program from the server, a process execution portion to execute a prescribed process, a display control portion, if the process execution portion produces display information to notify a user as a result of executing the prescribed process, to display a first display screen including the display information, and a screen generation portion to generate a second display screen based on the display information and the style sheet, if the display information is produced. While the screen received from the server is being displayed by the browsing portion, the display control portion displays the second display screen in place of the first display screen.

In accordance with a further aspect of the present invention, a cooperative job execution method is executed in an information processing apparatus which can communicate with a server in which an application program is installed so as to be executable. The cooperative job execution method includes: a browsing step of displaying a screen received from the server. The browsing step includes a step of receiving a setting screen for setting an execution condition for executing the application program from the server and a step of allowing the server to execute the application program in accordance with the execution condition set in the setting screen. The cooperative job execution method further includes a step of receiving a style sheet corresponding to the application program from the server, a step of executing a prescribed process, a step of, if display information to notify a user is produced as a result of execution of the prescribed process while the screen received from the server is not being displayed, displaying a first display screen including the display information, a step of, if display information to notify the user is produced as a result of execution of the prescribed process, generating a second display screen based on the display information and the style sheet, and a step of, if display information to notify a user is produced as a result of execution of the prescribed process while the screen received from the server is being displayed, displaying the second display screen.

In accordance with yet another aspect of the present invention, a non-transitory computer-readable recording medium is encoded with a cooperative job execution program causing a computer to execute a browsing step of displaying a screen received from the server. The browsing step includes a step of receiving a setting screen for setting an execution condition for executing the application program from the server and a step of allowing the server to execute the application program in accordance with the execution condition set in the setting screen. The program further causes a computer to execute a step of receiving a style sheet corresponding to the application program from the server, a step of executing a prescribed process, a step of, if display information to notify a user is produced as a result of execution of the prescribed process while the screen received from the server is not being displayed, displaying a first display screen including the display information, a step of, if display information to notify the user is produced as a result of execution of the prescribed process, generating a second display screen based on the display information and the style sheet, and a step of, if display information to notify a user is produced as a result of execution of the prescribed process while the screen received from the server is being displayed, displaying the second display screen.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram showing an exemplary hardware configuration of MFP.

DESCRIPTION OF THE PREFERRED EMBODIMENTS

Figure 1:
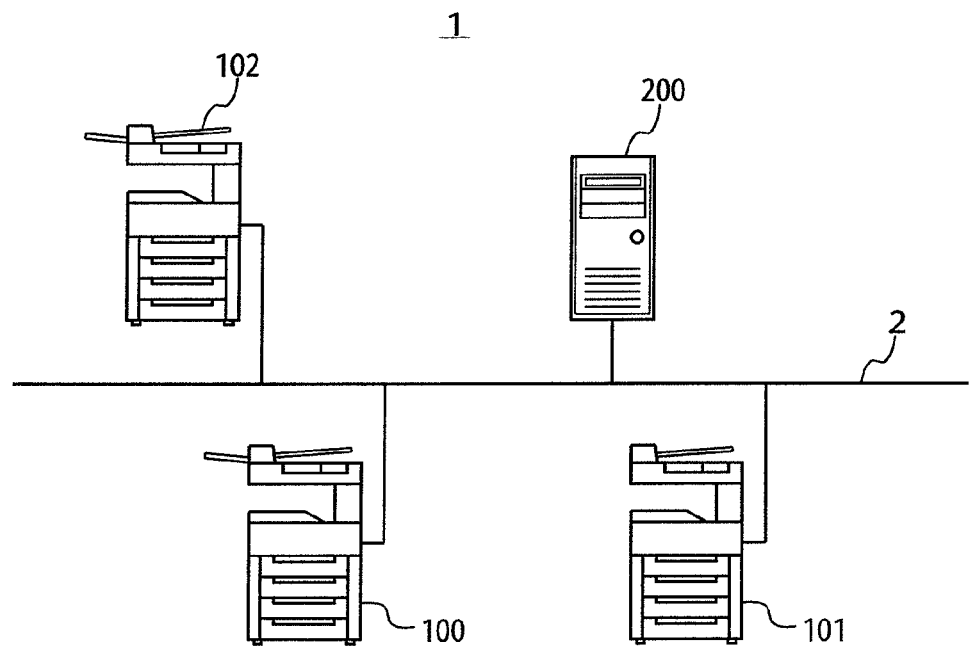
FIG. 1 is a diagram showing an overview of an information processing system in a first embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

First Embodiment

FIG. 1 is a diagram showing an overview of an information processing system in a first embodiment of the present invention. Referring to FIG. 1, an information processing system 1 includes MFP (Multi Function Peripheral) 100, 101, 102, which function as information processing apparatuses, and a server 200, each being connected to a network 2.

Network 2 is a local area network (LAN) and is connected to the Internet through a gateway. The connection form of network 2 is either wired or wireless. Network 2 is not limited to LAN and may be a network using Public Switched Telephone Network, a wide area network (WAN), or the Internet.

Server 200 is a general computer and is installed with an application program to function as a file server and a Web server. Server 200 thus provides predetermined Web service.

Each of MFP 100, 101, 102 includes a scanner for scanning documents, an image forming apparatus for forming an image on a recording medium such as paper based on image data, and a facsimile machine, and has an image scanning function, a copy function, and a facsimile transmission/reception function. Each of MFP 100, 101, 102 is installed with a general browsing program to receive provision of Web service from server 200 that functions as a Web server.

Here, server 200 provides Web service of character recognition of designated data, by way of example. Here, text data obtained through character recognition in server 200 is printed in MFP 100, 101, 102, by way of example. In this case, server 200 needs to specify data as an execution condition for executing an application program for character recognition and transmits a print condition setting screen as a setting screen for setting the execution condition. The print condition setting screen is a Web page.

The Web service may be, for example, Web service for setting a job to output data from MFP 100, 101, 102 using data stored in server 200, for example, an address book. Furthermore, the Web service may be such that server 200 uploads image data obtained by scanning a document in MFP 100, 101, 102 or data stored in MFP 100, 101, 102 and performs image processing such as OCR, sharpening, or color conversion on the uploaded data. In this case, the data subjected to image processing in server 200 may be returned to MFP 100, 101, 102 and processed in MFP 100, 101, 102, may be stored in server 200 without being returned to MFP 100, 101, 102, may be transmitted via email, may be file-transferred, or may be facsimiled.

Although in the present embodiment, MFP 100, 101, 102 will be described as an example of the information processing apparatus, MFP 100, 101, 102 may be replaced with any device including a function of processing images, for example, a printer or a facsimile machine. Alternatively, it may be a computer installed with a printer driver for controlling MFP 100, 101, 102. MFP 100, 101, 102 have the same function and therefore in the following description, MFP 100 will be described by way of example, unless otherwise specified.

Figure 2:
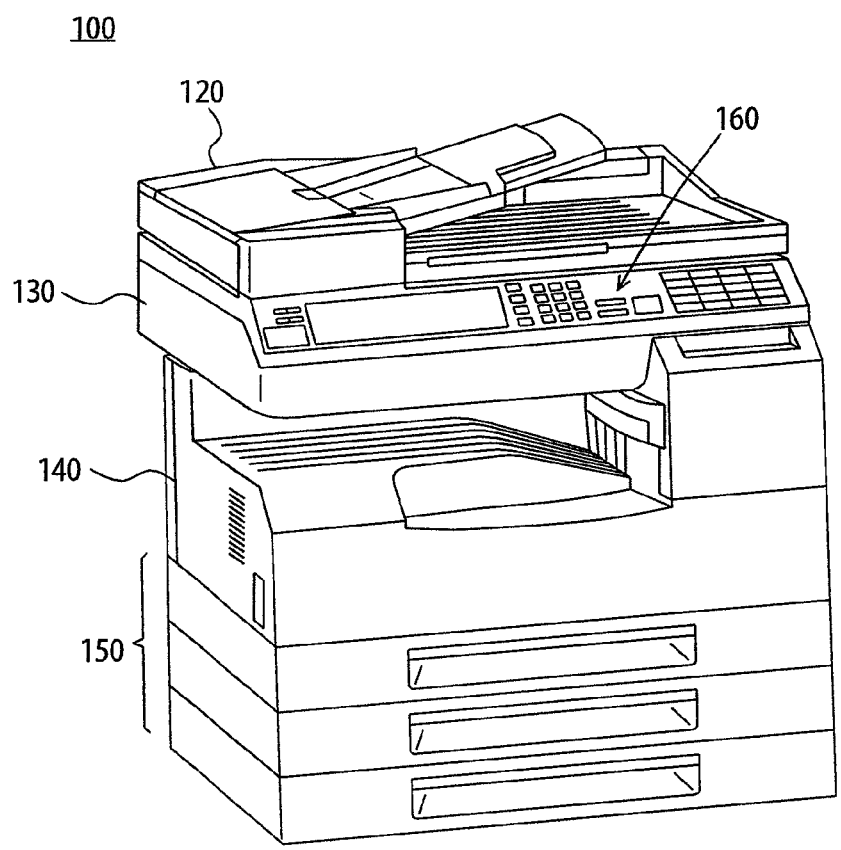
FIG. 2 is an external perspective view of MFP.

FIG. 2 is an external perspective view of MFP. FIG. 3 is a block diagram showing an exemplary hardware configuration of MFP. Referring to FIGS. 2 and 3, MFP 100 includes a main circuit 110, a document scanning portion 130 for scanning a document, an automatic document feeder 120 for transferring a document to document scanning portion 130, an image formation portion 140 for forming on paper and the like a still image output by document scanning portion 130 scanning a document, a paper-feeding portion 150 for supplying paper to image formation portion 140, and an operation panel 160 as a user interface. Main circuit 110 includes a CPU 111, a communication interface (I/F) portion 112, a ROM (Read Only Memory) 113, a RAM (Random Access Memory) 114, an EEPROM (Electronically Erasable and Programmable ROM) 115, a hard disk drive (HDD) 116 as a mass storage device, a facsimile portion 117, and a card interface (I/F) 118 to which a flash memory 118A is attached. CPU 111 is connected to automatic document feeder 120, document scanning portion 130, image formation portion 140, paper-feeding portion 150, and operation panel 160 to control MFP 100 as a whole.

ROM 113 stores a program executed by CPU 111 or data necessary to execute the program. RAM 114 is used as a work area when CPU 111 executes a program. RAM 114 also temporarily stores still images successively sent from document scanning portion 130.

Operation panel 160 is provided on the top face of MFP 100 and includes a display portion 160A and an operation portion 160B. Display portion 160A is a display such as a liquid crystal display (LCD), an organic ELD (Electroluminescence Display) and displays instruction menus for the user, information concerning the obtained image data, and the like. Operation portion 160B includes a plurality of keys and accepts inputs of data such as instructions, characters, and numerals through the user's operations corresponding to the keys. Operation portion 160B further includes a touch-panel provided on display portion 160A.

Communication I/F portion 112 is an interface for connecting MFP 100 to network 2. CPU 111 communicates with MFP 101, 102 or server 200 through communication I/F portion 112 to transmit/receive data. Communication I/F portion 112 can also communicate with a computer connected to the Internet via network 2. Communication portion I/F portion 112 sends/receives emails to/from a PC.

Facsimile portion 117 is connected to Public Switched Telephone Network (PSTN) to transmit facsimile data to PSTN or receive facsimile data from PSTN. Facsimile portion 117 stores the received facsimile data into HDD 116 or outputs the same to image formation portion 140. Image formation portion 140 prints the facsimile data received by facsimile portion 117 on paper. In addition, facsimile portion 117 converts image data output by document scanning portion 130 scanning a document or data stored in HDD 116 into facsimile data and transmits the facsimile data to a facsimile machine connected to PSTN.

Flash memory 118A is attached to card I/F 118. CPU 111 can access flash memory 118A through card I/F 118. CPU 111 loads a program recorded on flash memory 118A attached to card I/F 118, into RAM 114 for execution. It is noted that the program executed by CPU 111 is not limited to a program recorded in flash memory 118A, and a program stored in HDD 116 may be loaded into RAM 114 for execution. In this case, another computer connected to network 2 may overwrite the program stored in HDD 116 of MFP 100 or may additionally write a new program. Furthermore, MFP 100 may download a program from another computer connected to network 2 and store the program into HDD 116. The program referred to herein includes not only a program directly executable by CPU 111 but also a source program, a compressed program, an encrypted program, and the like.

Figure 4:
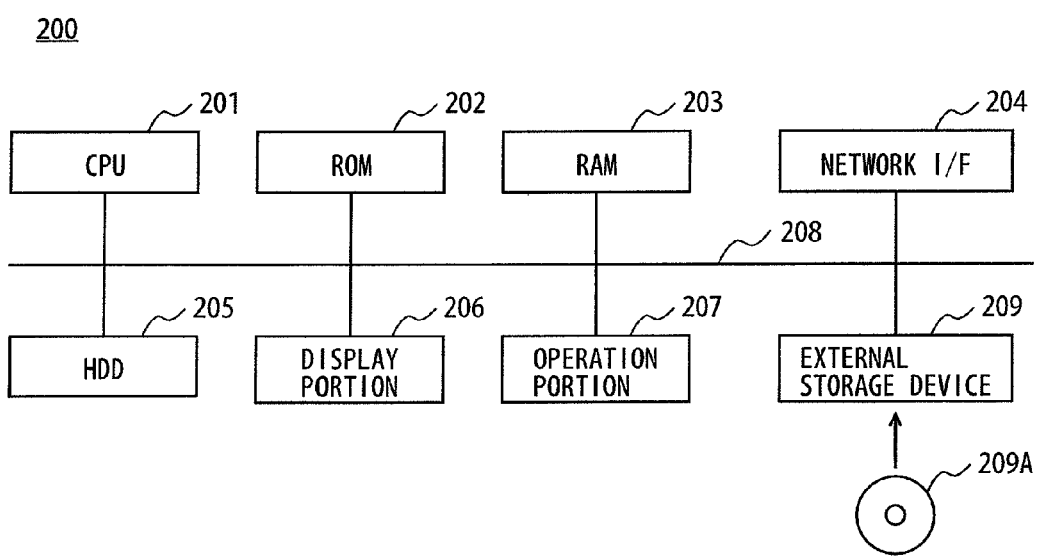
FIG. 4 is a block diagram showing an exemplary hardware configuration of a server.

FIG. 4 is a block diagram showing an exemplary hardware configuration of the server. Referring to FIG. 4, server 200 includes a CPU 201 for controlling the entire server 200, a ROM 202 for storing, for example, a program executed by CPU 201, a RAM 203 used as a working area for CPU 201, a network I/F 204 for connecting server 200 to a network, an HDD 205 as a mass storage device, a display portion 206, an operation portion 207 accepting input of the user's operation, and an external storage device 209, each being connected to a bus 208.

A CD-ROM (Compact Disc-ROM) 209A for storing a program is attached to external storage device 209. CPU 201 loads a program stored in CD-ROM 209A into RAM 203 through external storage device 209 for execution. It is noted that the recording medium for storing a program is not limited to CD-ROM 209A and may be flexible disk, a cassette tape, an optical disk (CD-ROM/MO (Magnetic Optical Disc)/MD (Mini Disc)/DVD (Digital Versatile Disc)), an IC card, an optical card, or a semiconductor memory such as a mask ROM, EPROM (Erasable Programmable ROM), EEPROM (Electrically Erasable and Programmable ROM). A program stored in HDD 205 may be loaded into RAM 203 for execution. In this case, server 200 may download a program from another computer connected to network 2 and store the downloaded program into HDD 205. The program referred to herein includes not only a program directly executable by CPU 201 but also a source program, a compressed program, an encrypted program, and the like.

Server 200 also functions as a file server, and therefore, here, an address book and a plurality of shared data are stored in HDD 205, by way of example.

Figure 5:
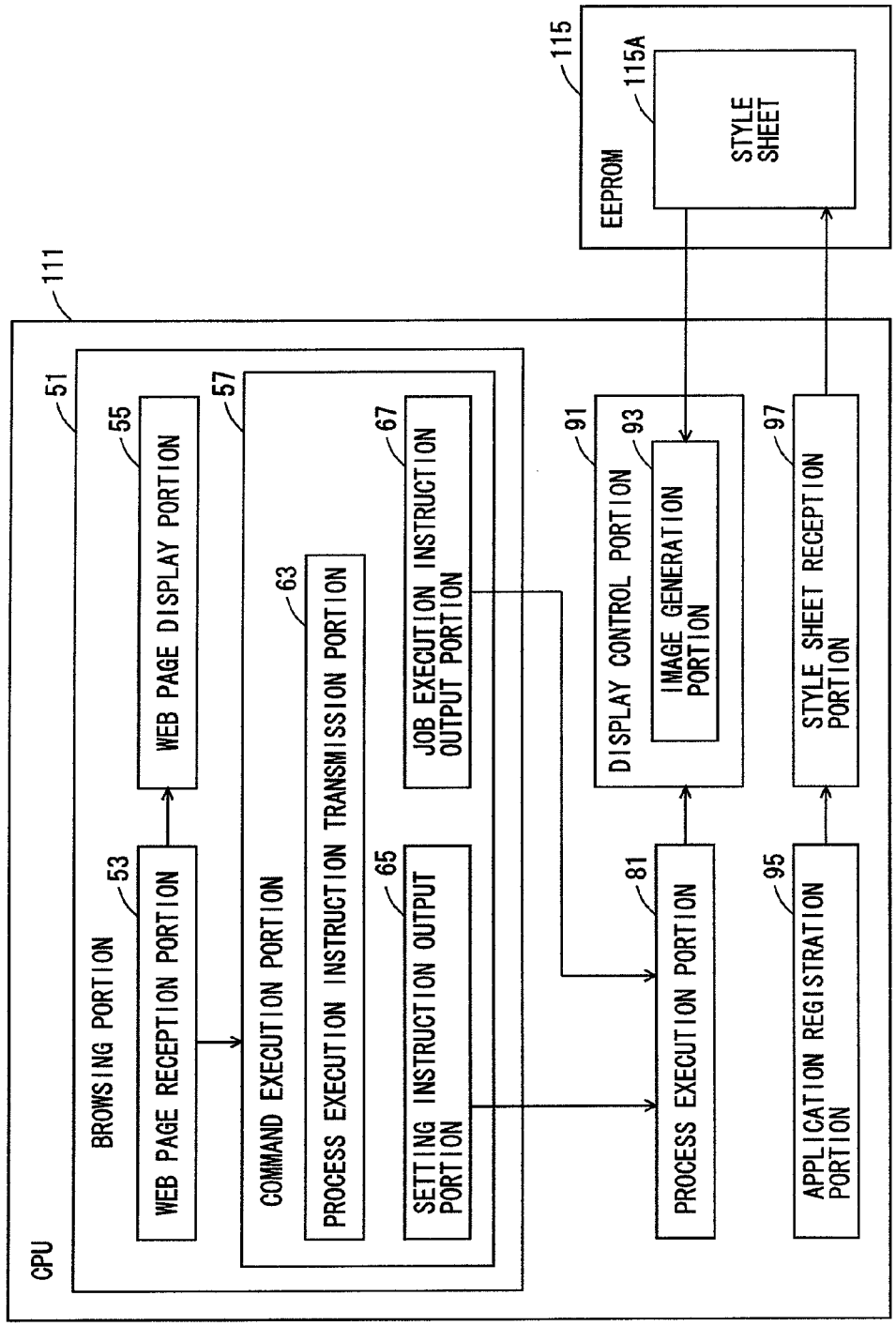
FIG. 5 is a functional block diagram showing an overview of functions of CPU of MFP and data stored in EEPROM.

FIG. 5 is a functional block diagram showing an overview of functions of CPU of MFP and data stored in EEPROM. The functions shown in FIG. 5 are implemented by CPU 111 of MFP 100 executing a cooperative job execution program stored in ROM 113 or flash memory 118A. Referring to FIG. 5, CPU 111 includes a browsing portion 51 configured by execution of a browsing program, a process execution portion 81, a display control portion 91 controlling display portion 160A, an application registration portion 95 registering an application executed in cooperation with server 200, and a style sheet reception portion 87.

Application registration portion 95 registers an application. Specifically, application registration portion 95 makes a setting for allowing server 200 to execute an application program installed in server 200. More specifically, a command for calling a Web service provided by server 200 is assigned to one of the buttons of operation portion 160B. This command activates browsing portion 51, which will be described later, to request server 200 to transmit a Web page, and includes the URL of the Web page. A Web page transmission request sent by browsing portion 51 to server 200 is, for example, transmission of GET command or POST command transmitted via HTTP communication protocol.

When registering an application, application registration portion 95 outputs to style sheet reception portion 97 application identification information that corresponds to the registered application for identifying an application program installed in server 200. The application identification information includes device identification information for identifying server 200. The device identification information is, for example, the name given to server 200, IP (Internet Protocol) address, or MAC (Media Access Control) address.

Style sheet reception portion 97 receives the application identification information to receive a style sheet from server 200 and store the received style sheet into EEPROM 115 in association with the application identification information. Accordingly, a style sheet 115A is stored in EEPROM 115. Specifically, style sheet reception portion 97 transmits a style sheet transmission request to server 200 through communication I/F portion 112. The style sheet transmission request includes application identification information. Server 200 receiving the transmission request returns a style sheet prepared beforehand corresponding to the application program identified by the application identification information. Style sheet reception portion 97 obtains the style sheet received by communication I/F portion 112 from server 200.

Style sheets are data that expresses the presentation of structured documents and define the rules of, for example, colors, fonts, and layouts for presenting the contents of structured documents. The structured documents are data written in HTML (Hyper Text Markup Language), XHTML (Extensible HTML), SVG (Scalable Vector Graphics), XUL (XML-based User Interface Language), or any other markup language. The style sheet language may be CSS (Cascading Style Sheets) corresponding to HTML if structured documents are written in HTML, or may be XSL (Extensible Stylesheet Language) corresponding to XML if they are written in XML. Here, it is assumed that HTML is used for a structured document and CSS is used for a style sheet, by way of example.

In the foregoing description, a style sheet is received for each application program installed in server 200. However, if a common display screen is used among a plurality of application programs installed in server 200, one style sheet is received from server 200. If the same application program is installed in a plurality of servers, a style sheet corresponding to that application program is received from one of the servers, rather than being received from each of the plurality of servers.

Browsing portion 51 includes a Web page reception portion 53 for receiving a Web page, a Web page display portion 55 for displaying the received Web page, and a command execution portion 57 executing a command included in the Web page. Web page reception portion 53 transmits a transmission request to request transmission of a Web page to server 200 through communication I/F portion 112. Server 200 receiving the transmission request transmits the Web page specified by the transmission request. Communication I/F portion 112 then receives the Web page from server 200. The Web page is thus obtained from communication I/F portion 112.

Here, among the buttons of operation portion 160B, the user designates a button to which application registration portion 95 allocates a command for calling a Web service provided by server 200, thereby requesting server 200 to transmit a Web page. The transmission request here is transmission of GET command or POST command transmitted via the HTTP communication protocol. Server 200 receiving the Web page transmission request sends the Web page specified by URL included in the transmission request.

Web page reception portion 53 outputs the received Web page to Web page display portion 55. Web page display portion 55 displays the Web page on display portion 160A. If the received Web page includes a command, Web page reception portion 53 outputs the command extracted from the Web page to command execution portion 57.

Command execution portion 57 executes the command input from Web page reception portion 53. Here, the Web page includes a print condition setting screen and includes a first command to send a process execution instruction to server 200, a second command to instruct MFP 100 to set print conditions, and a third command to instruct MFP 100 to execute a process, by way of example. When Web page reception portion 53 receives the Web page, the first to third commands are input to command execution portion 57. Accordingly, a process execution instruction transmission portion 63 for executing the first command, a setting instruction output portion 65 for executing the second command, and a job execution instruction output portion 67 for executing the third command are formed in command execution portion 57. Here, a function formed in command execution portion 57 when Web page reception portion 53 receives a Web page including a print condition setting screen will be described. However, the function formed in command execution portion 57 varies depending on the command included in the Web page received by Web page reception portion 53.

Figure 6:
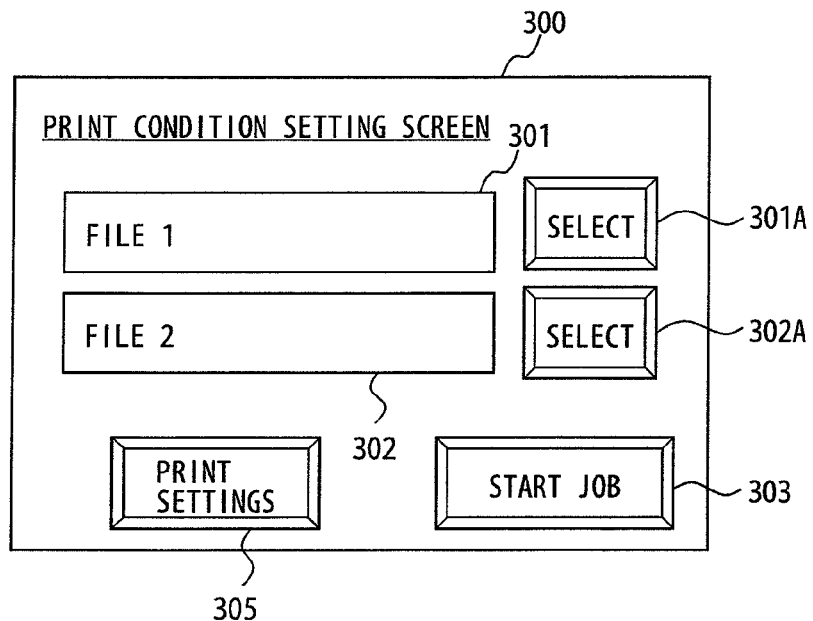
FIG. 6 shows an example of display of a print condition setting screen.

FIG. 6 shows an example of display of the print condition setting screen. Referring to FIG. 6, a print condition setting screen 300 includes regions 301, 302 for inputting file names, buttons 301A, 302A denoted by SELECT corresponding to regions 301, 302, a button 305 denoted by PRINT SETTINGS, and a button 303 denoted by START JOB.

Buttons 301A, 302A are each associated with the first command. Button 305 is associated with the second command. Button 303 is associated with the third command. Although print condition setting screen 300 shown here includes two regions 301, 302 for inputting file names, the number of input file names is not limited as long as at least one region is provided.

Returning to FIG. 5, when file names are input to regions 301, 302 in print condition setting screen 300, CPU 111 executes the first command. Thus, process execution instruction transmission portion 63 accepts the input file names. The file names input to regions 301, 302 are the file names of data stored in HDD 116 of MFP 100 or HDD 205 of server 200. File names may be directly input to regions 301, 302, or another Web page including a list of file names of data stored in HDD 116 of MFP 100 or HDD 205 of server 200 may be received and the selected one of the file names may be input.

When the user designates buttons 301A, 302A in print condition setting screen 300, process execution instruction transmission portion 63 selects the file names input in regions 301, 302 and transmits to server 200 the process execution instruction for allowing server 200 to execute a predetermined process. The predetermined process is determined depending on the application program installed in server 200 and is here the process of character recognition (OCR) of an image. The process execution instruction includes the file names input in regions 301, 302. Server 200 receiving the process execution instruction executes the process in accordance with the process execution instruction. Here, if button 301A is designated, the process execution instruction including the file name input to region 301 is transmitted to server 200, and if button 302A is designated, the process execution instruction including the file name input in region 302 is transmitted to server 200, so that server 200 executes the application program and executes the process. Server 200 executes a character recognition process, which is determined by the application program, on the data specified by the file name included in the process execution instruction, and returns text data resulting from the character recognition. When communication I/F portion 112 receives the processed data as the process result from server 200, job execution instruction output portion 67, which will be described later, receives the processed text data as the process result.

When the user designates button 305 in print condition setting screen 300, CPU 111 executes the second command. Then, setting instruction output portion 65 outputs a setting instruction to process execution portion 81. The setting instruction will be described later.

When the user designates button 303 in print condition setting screen 300, CPU 111 executes the third command. Then, job execution instruction output portion 67 outputs a job execution instruction to process execution portion 81. The job execution instruction includes the application identification information corresponding to the Web page received by Web page reception portion 53 and the processed text data received from server 200.

Process execution portion 81 receives the setting instruction from browsing portion 51 to accept a set value to be used to execute a function of MFP 100. MFP 100 can execute a plurality of functions, and for which function a set value is accepted is determined by the setting instruction input from browsing portion 51. Here, it is assumed that the setting instruction determines a set value for executing the print function. In this case, process execution portion 81 displays a setting screen for setting print conditions on display portion 160A, and accepts the set value input to operation portion 160B by the user as control information. Since the set value for executing the function of MFP 100 is accepted as control information, if a certain set value cannot be set in combination with another set value, the setting of such a combination of set values can be prevented at MFP 100. Therefore, for example, server 200 other than MFP 100 does not have to store such combinations of set values that cannot be set in combination.

Process execution portion 81 receives the job execution instruction from browsing portion 51 to execute a process on the processed text data from server 200 that is included in the job execution instruction, in accordance with the control identification information set earlier. Accordingly, an image of the text data generated through the character recognition process by server 200 is formed under the print conditions that can be set in MFP 100.

On the other hand, if an error such as paper-out or a paper jam occurs while process execution portion 81 is forming an image of text data, process execution portion 81 outputs to display control portion 91 error information and the application identification information included in the job execution instruction. The error information is output to display control portion 91 as a structured document written in a markup language.

Process execution portion 81 also executes a process in accordance with an operation input to operation portion 160B by the user. For example, the process may be a copy process, a scan process, and a facsimile transmission process. If an error occurs when process execution portion 81 executes a process in accordance with an operation input to operation portion 160B by the user, process execution portion 81 outputs the error information to display control portion 91. The error information in this case is distinguished from the error information output when process execution portion 81 receives a job execution instruction from browsing portion 51 and executes a process to produce an error, depending on whether the error information is output together with application identification information.

It is noted that the error information does not have to be written in a structured document in the case where an error occurs when process execution portion 81 executes a process in accordance with an operation input to operation portion 160B by the user.

When receiving the error information from process execution portion 81, display control portion 91 displays a first error display screen prepared beforehand for the error information on display portion 160A. On the other hand, when receiving the error information and the application identification information from process execution portion 81, display control portion 91 displays, on display portion 160A, a second error display screen generated by a screen generation portion 93 included in display control portion 91.

Screen generation portion 93 receives the error information and the application identification information from process execution portion 81 to generate a structured document in which the error information is written in a markup language (here, HTML). Screen generation portion 93 then reads out style sheet 115A associated with the application identification information, from among style sheets 115A stored in EEPROM 115, and generates the second error display screen based on the read style sheet and the generated structured document in which the error information is written. If style sheets 115A stored in EEPROM 115 do not include the one that is associated with the application identification information, screen generation portion 93 reads out a predetermined default style sheet and generates the second error display screen based on the read default style sheet and the generated structured document in which the error information is written.

When the job execution command and the application identification information are input from browsing portion 51 to process execution portion 81, the Web page received from server 200 executing the application program is displayed on display portion 160A. This Web page is a screen generated by server 200. If process execution portion 81 executes a process and produces an error at a stage during which the Web page generated by server 200 is being displayed, the second error display screen is displayed which is generated in accordance with the style sheet corresponding to the application program executed by server 200. Therefore, the color, character font, or layout of the screen is matched with those of the Web page. Accordingly, the color, character font, or layout of the screen does not change abruptly, so that the user can be notified that an error has occurred without feeling strange.

Figure 7:
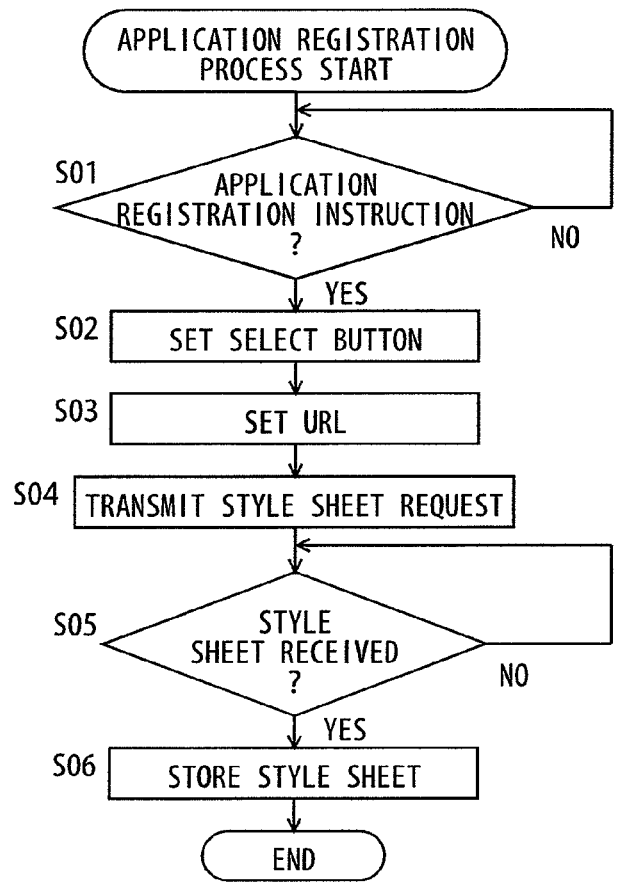
FIG. 7 is a flowchart showing an exemplary flow of an application registration process.

FIG. 7 is a flowchart showing an exemplary flow of an application registration process. The application registration process is a process executed by CPU 111 of MFP 100 executing the cooperative job execution program stored in ROM 113 or flash memory 118A. Referring to FIG. 7, CPU 111 determines whether an application registration instruction is accepted (step S01). If the user inputs an operation of designating a button set beforehand in operation portion 160B, the application registration instruction is accepted. The process waits until the application registration instruction is accepted (step S01), and if the application registration instruction is accepted, the process proceeds to step S02. In other words, the application registration process is a process executed on condition that the user inputs the application registration instruction to operation portion 160B.

The application registration instruction includes application identification information for identifying an application program and device identification information for identifying the server in which the application program is installed. Here, the device identification information of server 200 and the application identification information for identifying the application program installed in server 200 are input in step S01, by way of example.

In step S02, a select button is set. A button for registering an application is set among a plurality of buttons of operation portion 160B. The button may be set arbitrarily by the user or may be set automatically by CPU 111. A command to activate a browsing program is allocated to the selected button.

In the next step S03, URL is set. The URL here is the URL allocated to the top page of the Web service provided by server 200, in other words, the Web page initially output by the application program installed in server 200. The URL input to operation portion 160B by the user is accepted and allocated to the button set in step S02. Accordingly, when the user presses the select button set in step S01, the browsing program is activated, thereby completing the setting for transmitting GET command or POST command for obtaining the Web page having the URL set in step S02.

In step S04, a style sheet request is transmitted. Server 200 which is specified by the device identification information designated in step S01 is requested to transmit a style sheet corresponding to the application identification information input in step S01. Specifically, a style sheet transmission request including the application identification information is transmitted to server 200 through communication I/F portion 112. Server 200 receiving the transmission request returns the style sheet prepared beforehand corresponding to the application program specified by the application identification information. In the next step S05, the process waits until the style sheet is received from server 200 (NO in step S05). When the style sheet is received (YES in step S05), the process proceeds to step S06.

In the next step S06, the style sheet received in step S05 is associated with the application identification information input by the user in step S01 and is then stored into EEPROM 115. Accordingly, style sheet 115A is stored in EEPROM 115.

Figure 8:
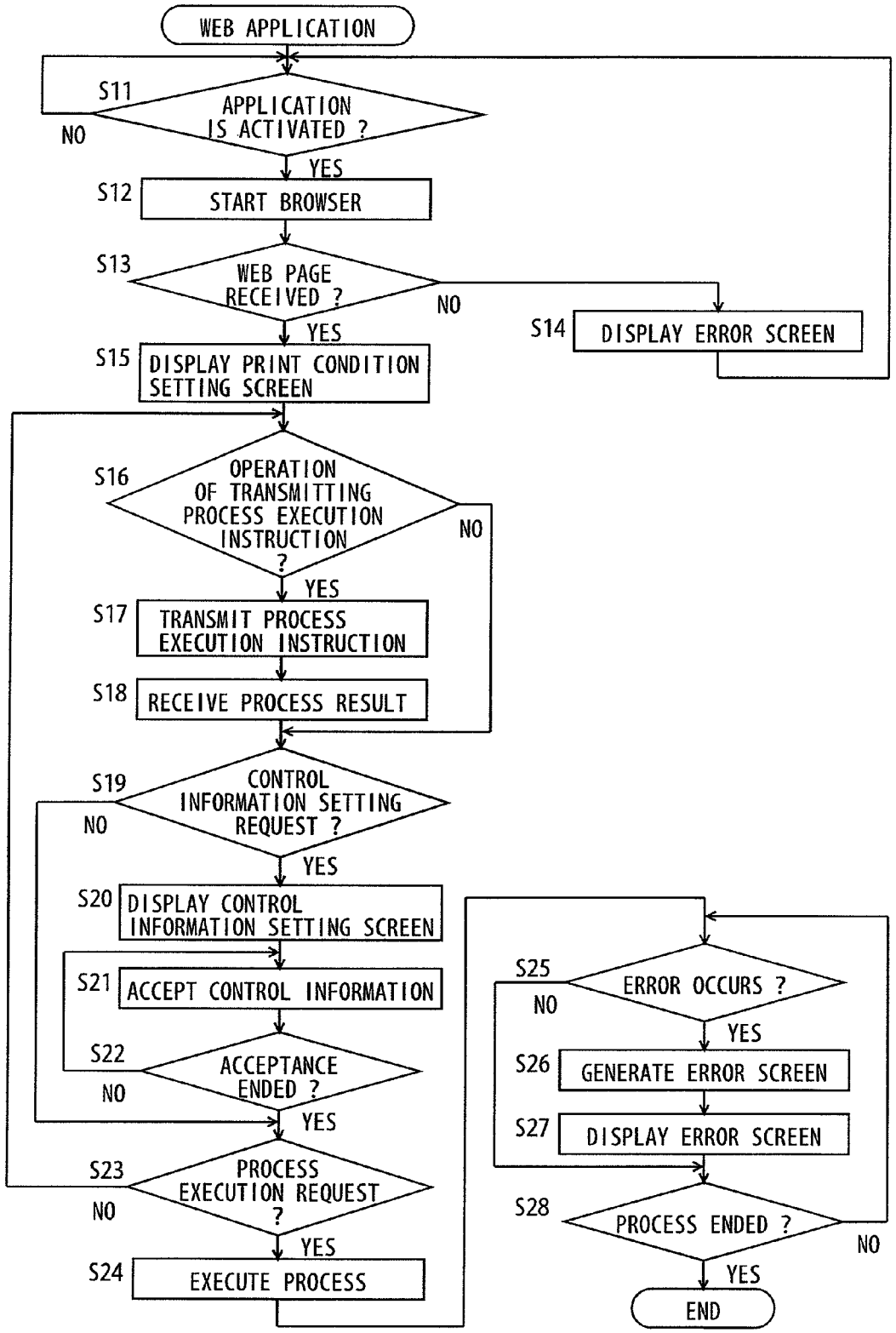
FIG. 8 is a flowchart showing an exemplary flow of a Web application execution process.

FIG. 8 is a flowchart showing an exemplary flow of a Web application execution process. The Web application execution process is a process executed by CPU 111 of MFP 100 executing the cooperative job execution program stored in ROM 113 or flash memory 118A. Referring to FIG. 8, CPU 111 determines whether an application is activated (step S11). The process waits until an application is activated (NO in step S11). When an application is activated (YES in step S11), the process proceeds to step S12. Here, if the user's operation of designating the select button set in step S02 of the application registration process shown in FIG. 7, among the buttons of operation portion 160B, is detected, it is determined that an application is activated.

In step S12, a browser is activated by executing a browsing program. At this time, CPU 111 executes the browsing program and then transmits GET command or POST command including the URL of the Web page to server 200 via the HTTP communication protocol in order to request transmission of the Web page specified by the URL allocated to the select button.

In the next step S13, it is determined whether a Web page is received. It is determined whether the Web page including the print condition setting screen is received from server 200. It is detected whether communication I/F portion 112 receives the Web page including the print condition setting screen from server 200. If the Web page including the print condition setting screen is received from server 200, the process proceeds to step S15. If not, the process proceeds to step S14.

In step S14, an error screen is displayed on display portion 160A, and the process then returns to step S11. The process proceeds to step S14 if the print condition setting screen is not received, for example, even after a prescribed time has passed, although the transmission request is transmitted in step S12. The error screen includes, for example, a message indicating that the Web service provided by server 200 is not available.

In step S15, the print condition setting screen included in the received Web page is displayed on display portion 160A. In the next step S16, it is determined whether the operation of transmitting a process execution instruction is accepted or not. If the operation of transmitting a process execution instruction is accepted, the process proceeds to step S17. If not, the process proceeds to step S19. Here, the operation of transmitting a process execution instruction is the operation of inputting a file name in one of regions 301 and 302 in the print condition setting screen and designating one of buttons 301A and 302A. If the operation of designating one of buttons 301A and 302A is detected, it is determined that the file name is accepted, and the process then proceeds to step S17. In step S17, a process execution instruction including the accepted file name is transmitted to server 200.

Upon receiving the process execution instruction, server 200 executes the application program to perform OCR on the data specified by the file name included in the process execution instruction and returns text data. In the next step S18, the process result is received from server 200, and the process then proceeds to step S19. The process result received from server 200 is text data obtained by OCR of the data specified by the file name included in the process execution instruction.

In step S19, it is determined whether a request to set control information is accepted. If a request to set control information is accepted, the process proceeds to step S20. If not, the process proceeds to step S23. If the operation of designating button 305 in print condition setting screen 300 is detected, it is determined that a request to set control information is accepted. In step S20, a control information setting screen is displayed on display portion 160A. The control information setting screen is here a setting screen for setting print conditions. Then, a set value input to operation portion 160B by the user in accordance with the setting screen for setting print conditions is accepted as control information (step S21). Then, it is determined whether the acceptance of control information is ended (step S22). For example, if it is detected that a button to which an instruction to end setting is allocated is designated in the setting screen for setting print conditions, it is determined that the acceptance of control information is ended. The acceptance of control information in step S21 continues until the acceptance of control information is ended. If the acceptance of control information is ended, the control information setting screen is closed, and the process then proceeds to step S23.

In step S23, it is determined whether a process execution request is accepted. If a process execution instruction is accepted, the process proceeds to step S24. If not, the process returns to step S16. If the operation of designating button 303 in print condition setting screen 300 is detected, it is determined that a process execution request is accepted. In step S24, the text data that is the process result received in step S18 is processed in accordance with the control information accepted in step S20. Here, an image of the text data that is the process result received in step S18 is formed in accordance with the print conditions that are control information accepted in step S20.

In step S25, it is determined whether an error occurs during the process being executed in step S24. If an error occurs, the process proceeds to step S26. If not, the process proceeds to step S28. In step S26, an error screen is generated. Specifically, from among style sheets 115A stored in EEPROM 115, style sheet 115A associated with the application identification information corresponding to the application activated in step S11 is read out. Then, a structured document in which error information corresponding to the occurring error is written in a markup language is generated, and the second error display screen is generated to display the structured document in accordance with the read style sheet 115A.

In the next step S27, the generated second error display screen is displayed on display portion 116A, and the process then proceeds to step S28. In step S28, it is determined whether an end instruction is accepted. If an end instruction is accepted, the process ends. If not, the process returns to step S25. If the operation of closing print condition setting screen 300 displayed on display portion 160A in step S15 is detected, the end instruction is accepted.

<Modification>

In the foregoing first embodiment, if process execution portion 81 executes a process and produces an error, while browsing portion 51 is displaying the print condition setting screen received from server 200, the second error display screen is generated and displayed without displaying the first error display screen in MFP 100.

In the information processing system in a modified embodiment, in MFP 100, browsing portion 51 rather than display control portion 91 displays the second error display screen. Specifically, screen generation portion 93 included in display control portion 91 generates the second error display screen, stores it into EEPROM 115, and transmits the URL of the second error display screen to the server.

Server 200 modifies the print condition setting screen such that the link information to the second error display screen is embedded therein, based on the URL of the second error display screen received from MFP 100, and then transmits the print condition setting screen including the embedded link information to MFP 100. At MFP 100, Web page reception portion 53 included in browsing portion 51 receives the print condition setting screen including the embedded link information and outputs it to Web page display portion 55. Web page display portion 55 displays on display portion 160A the print condition setting screen in which the link information is embedded. The user operates operation portion 160B to designate the link information embedded in the print condition setting screen, so that Web page reception portion 53 reads out the second error display screen specified by the URL included in the link information and outputs the same to Web page display portion 55. Web page display portion 55 displays on display portion 160A the second error display screen read out from EEPROM.

If the information of the error produced in process execution portion 81 is not predetermined prescribed information, the second error display screen may be displayed promptly. If the error information is prescribed information, the URL of the second error display screen may be transmitted to server 200, without promptly displaying the second error display screen. The error information is prescribed information, for example, if the information is less urgent such as when the toner is low.

Although the data processed in server 200 is processed in MFP 100 in the foregoing first embodiment, the present invention is applicable to the case where the data processed in MFP 100 is processed in server 200. For example, the process of scanning a document is performed in MFP 100, and the image data obtained by scanning a document in MFP 100 is sent by email to server 200. In this case, referring to FIG. 5, in browsing portion 51, job execution instruction output portion 67 outputs a process execution instruction to instruct process execution portion 81 to scan. Process execution portion 81 then scans a document, stores the scanned image data into EEPROM 115, and outputs the file name of the image data to browsing portion 51. Thus, setting instruction output portion 65 is not necessary.

Second Embodiment

In MFP 100 in the foregoing first embodiment, the task of browsing portion 51 and the task of process execution portion 81 that are formed in CPU 111 communicate with each other. In MFP 100 in the second embodiment, the task of a browsing portion 51A formed in CPU 111 does not communicate with any other task. In this case, browsing portion 51A formed in CPU 111 communicates only with server 200.

The overview of the information processing system in the second embodiment is the same as the overview shown in FIG. 1, and the hardware configurations of MFP 100 and server 200 are also the same as the hardware configurations shown in FIG. 2 and FIG. 3. Therefore, a description thereof will not be repeated here.

In a print system in the second embodiment, the application program to cause server 200 to provide Web service is generated based on API (Application Program Interface) disclosed by the manufacturer of MFP 100, 101, 102. Therefore, server 200 controls MFP 100, 101, 102 by transmitting commands to MFP 100, 101, 102, for example, via SOAP (Simple Object Access Protocol) communication protocol.

Figure 9:
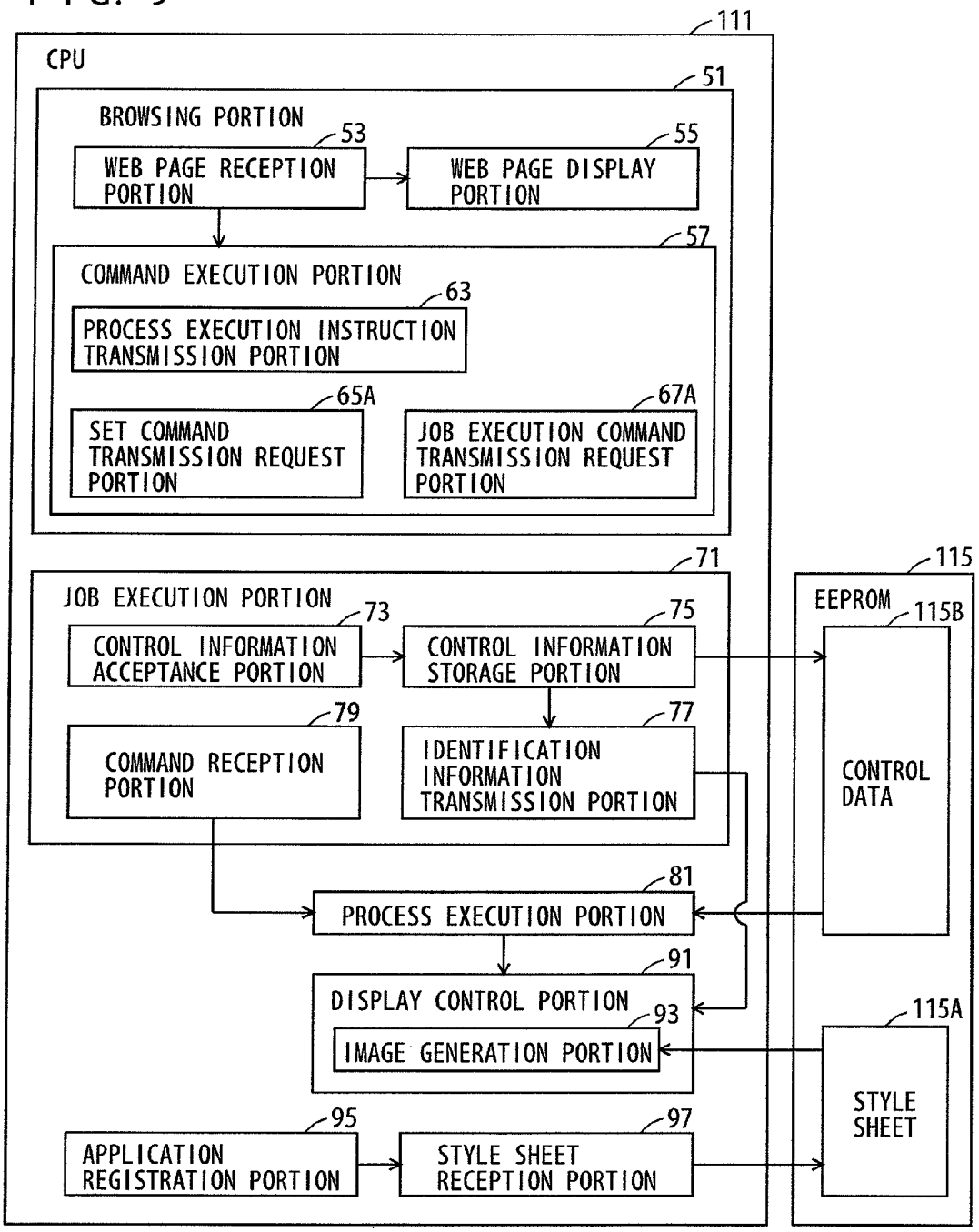
FIG. 9 is a functional block diagram showing an overview of functions of CPU of MFP and data stored in EEPROM in a second embodiment.

FIG. 9 is a functional block diagram showing an overview of functions of CPU of MFP and data stored in EEPROM in the second embodiment. Referring to FIG. 9, the shown diagram differs from the functional block diagram shown in FIG. 5 in that, in command execution portion 57, setting instruction output portion 65 is changed to a set command transmission request portion 65A and job execution instruction output portion 67 is changed to a job execution command transmission request portion 67A, that a job execution portion 71 is added, and that control data 115B is stored in EEPROM 115. The other functions are the same as shown in FIG. 5. Therefore, a description thereof will not be repeated here, and only the functions different from those shown in FIG. 5 will be mainly described.

When Web page reception portion 53 receives a Web page, the first to third commands are input to command execution portion 57. Accordingly, process execution instruction transmission portion 63 for executing the first command, set command transmission request portion 65A for executing the second command, and job execution command transmission request portion 67A for executing the third command are formed in command execution portion 57.

Referring now to FIG. 6, as described above, buttons 301A and 302A are each associated with the first command, button 305 is associated with the second command, and button 303 is associated with the third command.

When the user designates button 305 in print condition setting screen 300, CPU 111 executes the second command. Thus, set command transmission request portion 65A transmits to server 200 a set command transmission request to allow server 200 to transmit a set command. The set command will be described later.

When the user designates button 303 in print condition setting screen 300, CPU 111 executes the third command. Thus, job execution command transmission request portion 67A transmits to server 200 a job execution command transmission request to allow server 200 to transmit a job execution command. The job execution command transmission request will be described later.

Job execution portion 71 includes a control information accepting portion 73 accepting control information, a control information storage portion 75 assigning control identification information to control information and storing them in association with each other, an identification information transmission portion 77 for transmitting the control identification information assigned to the control information to server 200, a command reception portion 79 receiving a command from server 200, and process execution portion 81 executing a process in accordance with the job execution command.

When set command transmission request portion 65A transmits the set command transmission request to server 200, server 200 transmits a set command to designate setting of control information and application identification information. Control information accepting portion 73 controls communication I/F portion 112 to receive the set command and the application identification information transmitted from server 200. When job execution command transmission request portion 67A transmits the job execution command transmission request to server 200, server 200 transmits the job execution command and the application identification information. Command reception portion 79 receives the job execution command and the application identification information from server 200 and then outputs them to process execution portion 81. The job execution command includes the control identification information and the result of the process executed in accordance with the process execution instruction by server 200 receiving the process execution instruction.

Control information accepting portion 73 receives the set command and the application identification information from server 200 to accept the set value to be used to execute a function of MFP 100. MFP 100 can execute a plurality of functions, and for which function a set value is accepted is determined depending on the set command received from server 200. Here, the set command determines a set value for executing a print function. In this case, control information accepting portion 73 displays a setting screen for setting print conditions on display portion 160A and accepts, as control information, the set value input to operation portion 160B by the user. Since the set value for executing the function of MFP 100 is accepted as control information, if a certain set value cannot be set in combination with another set value, the setting of such a combination of set values can be prevented at MFP 100. Therefore, for example, any device other than MFP 100 does not have to store such combinations of set values that cannot be set in combination. Control information accepting portion 73 outputs the accepted control information to control information storage portion 75.

Control information storage portion 75 assigns control identification information to the control information input from control information accepting portion 73 to identify the control information and outputs the control identification information and the application identification information to identification information transmission portion 77. Control information storage portion 75 also stores control data in which the control identification information and the control information are associated with each other, into EEPROM 115. Thus, control data 115B is stored in EEPROM 115.

Figure 10:
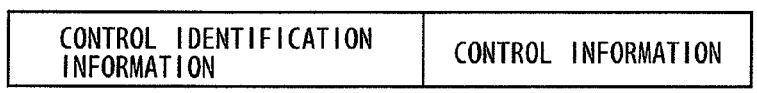
FIG. 10 shows an exemplary format of control data.

FIG. 10 shows an exemplary format of the control data. Referring to FIG. 10, control data 115B includes control identification information and control information. One control data 115B is stored each time the control information is set.

Returning to FIG. 9, identification information transmission portion 77 transmits the control identification information input from control information storage portion 75 to server 200 through communication I/F portion 112. If the transmission of the control identification information is failed, identification information transmission portion 77 outputs to display control portion 91 the application identification information input together with the control identification information and error information indicating that the transmission is failed. Display control portion 91 receives the error information and the application identification information from identification information transmission portion 77 and then displays on display portion 160A the second error display screen generated by screen generation portion 93 included in display control portion 91. Accordingly, the second error display screen appears, which is generated with the same style information as the Web page displayed by Web page display portion 55, so that the user does not feel strange.

Upon input of the job execution command from command reception portion 79, process execution portion 81 reads out control data 115B including the control identification information included in the job execution command, from among control data 115B stored in EEPROM 115, and obtains the control information included in the read control data 115B. Then, process execution portion 81 executes a process in accordance with the obtained control information and the result of the process executed by server 200 in accordance with the process execution instruction that is included in the job execution command. As described later, the result of the process executed by server 200 in accordance with the process execution instruction that is included in the job execution command received from server 200 is the result of the process executed by server 200 receiving the process execution instruction transmitted by process execution instruction transmission portion 63, and here, the result of character recognition of the data specified by the file name included in the process execution instruction. Therefore, the job execution command includes text data that is the result of processing by server 200. Thus, process execution portion 81 forms an image of the text data that is the result of processing by server 200, in accordance with the set value for printing as indicated by the control information included in the job execution command. Accordingly, an image of the text data output through character recognition by server 200 is formed under the print conditions that can be set in MFP 100.

Figure 11:
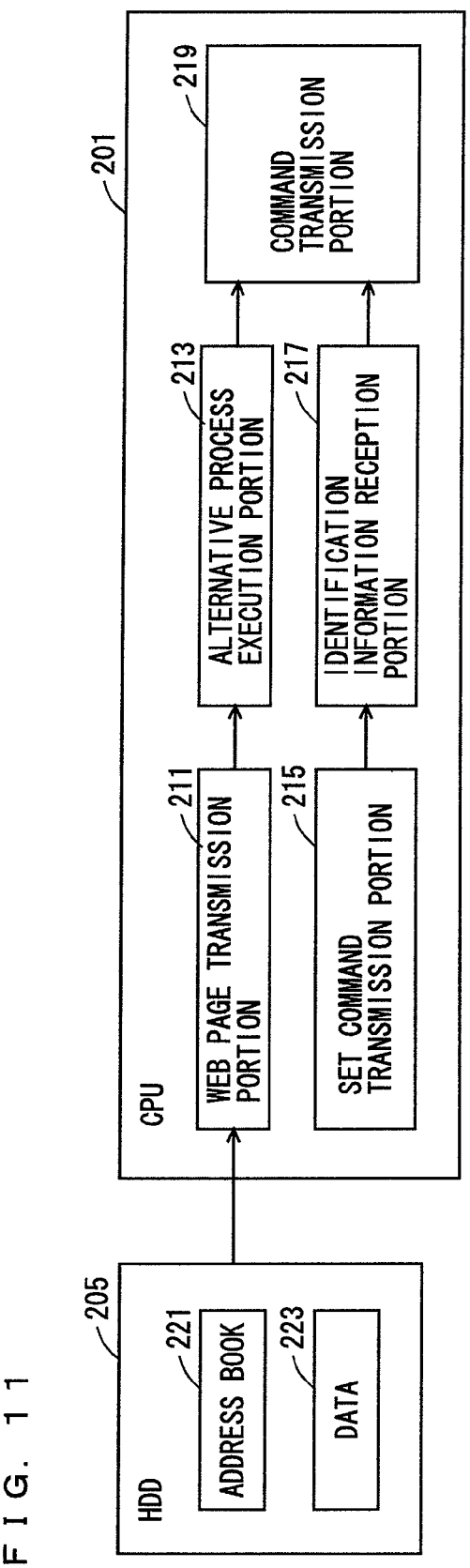
FIG. 11 is a functional block diagram showing functions of CPU 201 of the server and data stored in HDD.

FIG. 11 is a functional block diagram showing the functions of CPU 201 included in the server and data stored in HDD. Referring to FIG. 11, CPU 201 includes a Web page transmission portion 211 transmitting a Web page in response to a request, an alternative process execution portion 213 executing a prescribed process, a set command transmission portion 215 transmitting a set command to designate setting of control information, an identification information reception portion 217 receiving control identification information, and a command transmission portion 219 transmitting a job execution command.

Server 200 executes the installed application program to provide Web service. CPU 201 executes the installed application program, so that alternative process execution portion 213 is formed in CPU 201, and a Web page corresponding to the application program is transmitted.

An address book 221 and data 223 are stored beforehand in HDD 205. Address book 221 and data 223 are set to be shared so as to be accessed by a plurality of users.

When network I/F 204 receives a transmission request to request transmission of a Web page from MFP 100, Web page transmission portion 211 reads out the Web page specified by the URL included in the transmission request from HDD 205 and transmits the Web page through network I/F 204. Here, MFP 100 transmits a transmission request to request transmission of the Web page including the print condition setting screen shown in FIG. 6. Therefore, Web page transmission portion 211 transmits the Web page including the print condition setting screen shown in FIG. 6. Web page transmission portion 211 notifies alternative process execution portion 213 that the Web page including print condition setting screen 300 is transmitted to MFP 100.

The Web page may include identification information for identifying a record included in address book 221 or data 223 stored in HDD 205 or may include process identification information for specifying a process that can be executed by server 200. Here, the Web page including print condition setting screen 300 is associated with the process of obtaining data specified by the user, performing character recognition of the obtained data, and sending back text data. It is preferable that the Web page includes the file name of data 223 so that the user can specify data 223 stored in server 200. If the Web page includes a record included in address book 221, the Web page is associated with the process of selecting the record included in address book 221. If the Web page includes process identification information for specifying a process that can be executed by server 200, the Web page can be associated with the process identified by the process identification information.

Alternative process execution portion 213 controls network I/F 204 to receive a process execution instruction sent from MFP 100 and execute a process in accordance with the process execution instruction. Here, the process execution instruction defines the process of performing character recognition of data specified by the file name included therein. Therefore, alternative process execution portion 213 obtains the data specified by the file name for character recognition. When receiving the process execution instruction, alternative process execution portion 213 obtains session identification information for identifying a communication session established with MFP 100. Then, alternative process execution portion 213 outputs to command transmission portion 219 the pair of the result of the process (hereinafter referred to as "process execution result") executed by alternative process execution portion 213 in accordance with the process execution instruction and the obtained session identification information. The process execution result here includes text data obtained through character recognition.

If the Web page transmitted by Web page transmission portion 211 is associated with the process of selecting a destination address in an email transmission process or a file transfer process from the addresses included in address book 221 stored in HDD 205, the process execution result includes the address included in the process execution instruction. Furthermore, if the Web page transmitted by Web page transmission portion 211 is associated with the process of executing prescribed image processing, the process execution result includes the data subjected to the image processing by server 200 or the file name for identifying that data.

Set command transmission portion 215 controls network I/F 204 to receive the set command transmission request sent from MFP 100 and then transmits the pair of the set command to designate setting of control information and the application identification information to MFP 100 that has sent the set command transmission request, through network I/F 204. Here, set command transmission portion 215 transmits the pair of the set command and the application identification information in accordance with SOAP (Simple Object Access Protocol) communication protocol.

As described above, when the control information is set, MFP 100 receiving the set command transmits control identification information for identifying the control information. Identification information reception portion 217 controls network I/F 204 to receive the control identification information transmitted from MFP 100. When receiving the control identification information, identification information reception portion 217 also obtains the session identification information for identifying the communication session established with MFP 100. Then, the pair of the received control identification information and the obtained session identification information is output to command transmission portion 219.

Command transmission portion 219 receives the pair of the process execution result and the session identification information from alternative process execution portion 213 and receives the pair of the control identification information and the session identification information from identification information reception portion 217. Command transmission portion 219 controls network I/F 204 to receive the job execution command transmission request transmitted from MFP 100. When receiving the job execution command transmission request, command transmission portion 219 also obtains session identification information for identifying the communication session established with MFP 100 that has sent the job execution command transmission request. Then, a job execution command is generated which includes the process execution result and the control identification information, each paired with the obtained session identification information.

Furthermore, the pair of the generated job execution command and the application identification information is transmitted to MFP 100 that has sent the job execution command transmission request, through network I/F 204. Here, command transmission portion 219 transmits the pair of the job execution command and the application identification information in accordance with SOAP communication protocol. The job execution command includes the control identification information and the result of the process executed in accordance with the process execution instruction received when the communication session having the same session identification information as the communication session established when the control identification information is received is established. Therefore, the process result can be associated with the control information set in MFP 100 for each transmitted Web page including the print condition setting screen.

Figure 12:
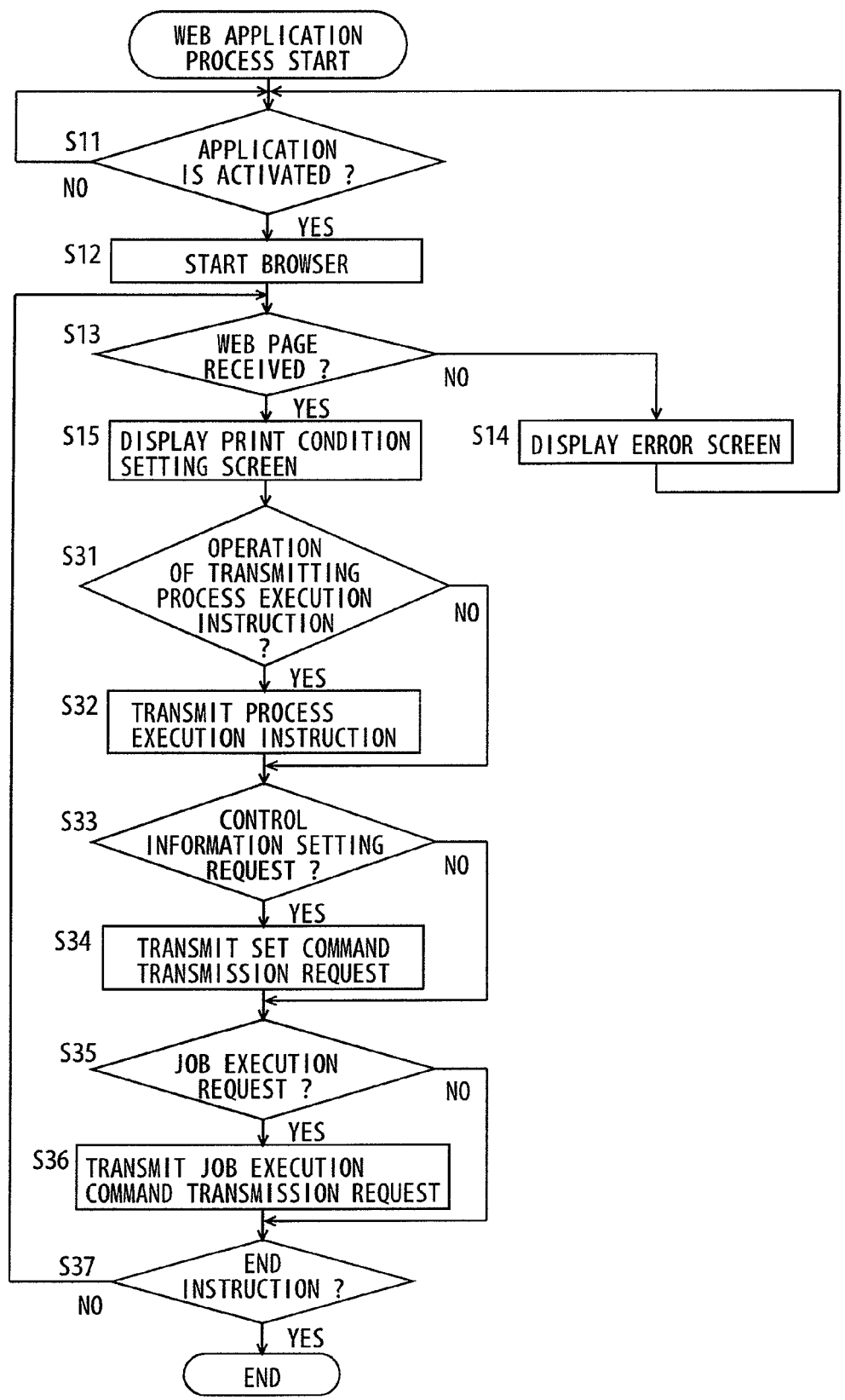
FIG. 12 is a flowchart showing an exemplary flow of a Web application process in the second embodiment.

FIG. 12 is a flowchart showing an exemplary flow of a Web application process in the second embodiment. The Web application process is a process executed by CPU 111 of MFP 100 executing the cooperative job execution program. Referring to FIG. 12, steps S11 to S15 are the same as those of the process shown in FIG. 8. Therefore, a description thereof will not be repeated here.

In step S31, it is determined whether the operation of transmitting a process execution instruction is accepted. If the operation of transmitting a process execution instruction is accepted, the process proceeds to step S32. If not, step S32 is skipped and the process proceeds to step S33. Here, the operation of transmitting a process execution instruction is the operation of inputting a file name into one of regions 301 and 302 and designating one of buttons 301A and 302A in the print condition setting screen. When the operation of designating one of buttons 301A and 302A is detected, it is determined that a file name is accepted, and the process then proceeds to step S32. In step S32, a process execution instruction including the accepted file name is transmitted to server 200.

In step S33, it is determined whether a request to set control information is accepted. If a request to set control information is accepted, the process proceeds to step S34. If not, the process skips step S34 and proceeds to step S35. When the operation of designating button 305 in print condition setting screen 300 is detected, it is determined that the request to set control information is accepted. In step S34, a set command transmission request is transmitted to server 200. Step S33 and step S35 are executed by CPU 111 executing the second command included in print condition setting screen 300 and associated with button 305.

In step S35, it is determined whether a job execution request is accepted. If a job execution request is accepted, the process proceeds to step S36. If not, the process skips step S36 and proceeds to step S37. When the operation of designating button 303 in print condition setting screen 300 is detected, it is determined that a job execution request is accepted. In step S36, a job execution command transmission request is transmitted to server 200. Step S35 and step S36 are executed by CPU 111 executing the third command included in print condition setting screen 300 and associated with button 303.

In step S37, it is determined whether an end instruction is accepted. If an end instruction is accepted, the process ends. If not, the process returns to step S13. When the operation of closing print condition setting screen 300 displayed on display portion 160A in step S15 is detected, an end instruction is accepted. When the end instruction is accepted, the communication session established with server 200 is cut off.

Figure 13:
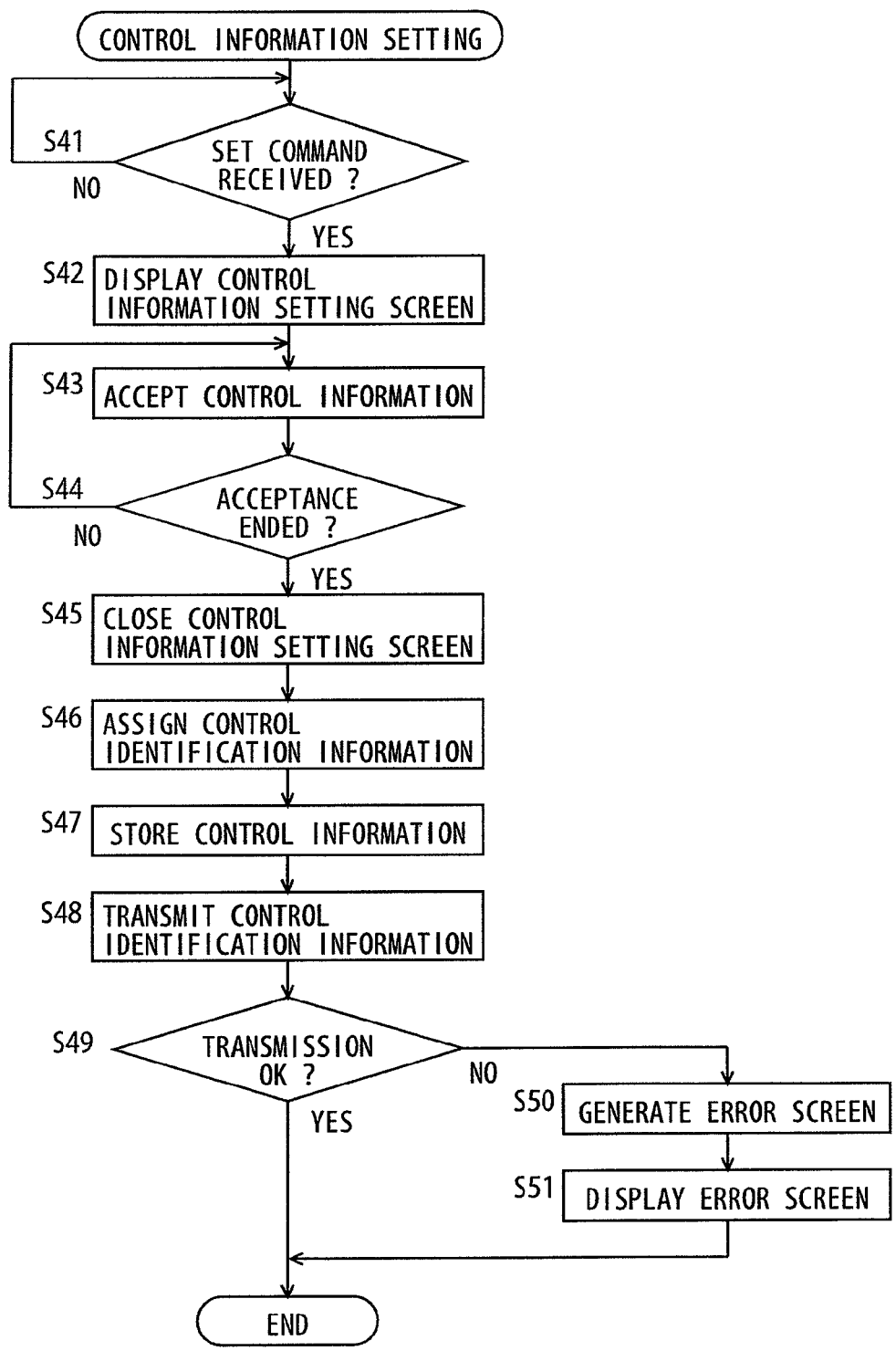
FIG. 13 is a flowchart showing an exemplary flow of a control information setting process.

FIG. 13 is a flowchart showing an exemplary flow of a control information setting process. The control information setting process is a process that is executed by CPU 111 of MFP 100 executing the cooperative job execution program and is executed concurrently with the above-noted Web application process. Referring to FIG. 13, CPU 111 determines whether a set command is received (step S41). The process waits until communication I/F portion 112 receives a set command from server 200, and if a set command is received (YES in step S41), the process proceeds to step S42. In other words, the process after step S42 is executed on condition that the set command is received from server 200. The set command is transmitted by server 200 that receives the set command transmission request, in response to the set command transmission request being transmitted to server 200 in step S34 in FIG. 12, and is received together with the application identification information for identifying the application program executed by server 200.

In step S42, a control information setting screen is displayed on display portion 160A. The control information setting screen is here a setting screen for setting print conditions. Then, a set value input to operation portion 160B by the user in accordance with the setting screen for setting print conditions is accepted as control information (step S43). Then, it is determined whether the acceptance of control information is ended (step S44). For example, if it is detected that the button to which the instruction to end setting in the setting screen for setting print conditions is designated, it is determined that the acceptance of control information is ended. The acceptance of control information in step S43 continues until the acceptance of control information is ended. When the acceptance of control information is ended, the process proceeds to step S45.

In step S45, the control information setting screen is closed, and the process proceeds to step S46. In step S46, control identification information is assigned to the control information accepted in step S43 to identify that control information. In the next step S47, the control information accepted in step S43 is associated with the control identification information assigned in step S46 and stored into EEPROM 115.

In step S48, the assigned control identification information is transmitted to server 200. In the next step S49, it is determined whether the transmission is successful. If the transmission is successful, the process ends. If not, the process proceeds to step S50. In step S50, an error screen is generated. Specifically, style sheet 115A associated with the application identification information received together with the set command received in step S41 is read out from among style sheets 115A stored in EEPROM 115. Then, a structured document in which error information corresponding to the occurring error is written in a markup language is generated, and the second error display screen is generated based on the read style sheet 115A and the generated structured document. In the next step S51, the generated second error display screen is displayed on display portion 160A, and the process then ends.

Figure 14:
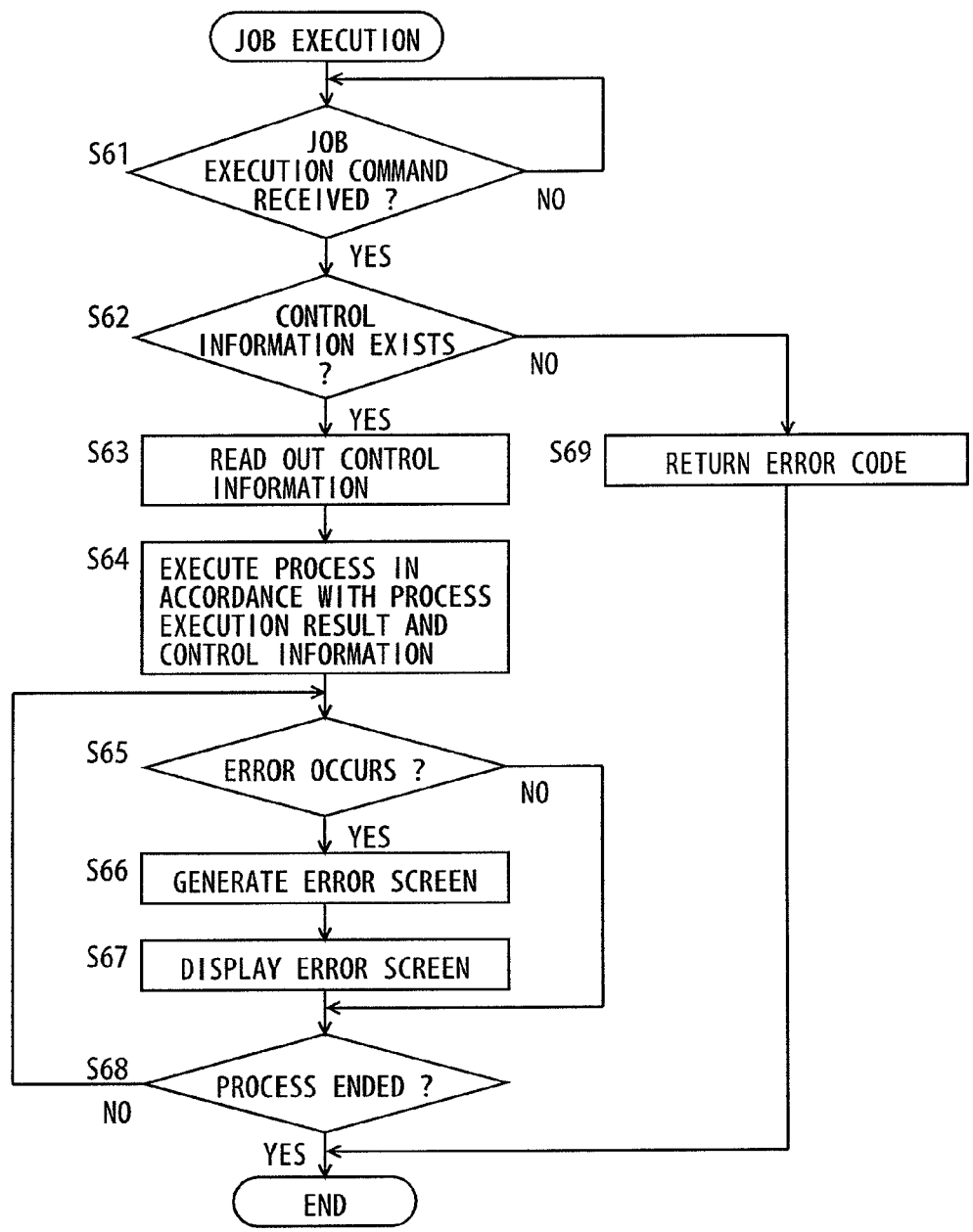
FIG. 14 is a flowchart showing an exemplary flow of a job execution process.

FIG. 14 is a flowchart showing an exemplary flow of a job execution process. The job execution process is a process that is executed by CPU 111 of MFP 100 executing the cooperative job execution program and is executed concurrently with the above-noted Web application process. Referring to FIG. 14, CPU 111 determines whether a job execution command is received (step S61). The process waits until communication I/F portion 112 receives a job execution command from server 200 (NO in step S61). If a job execution command is received (YES in step S61), the process proceeds to step S62. In other words, the process after step S62 is executed on condition that the job execution command is received from server 200.

The job execution command is transmitted by server 200 that receives the job execution command transmission request, in response to the job execution command transmission request being transmitted in step S36 in FIG. 12, and is received together with the application identification information for identifying the application program executed by server 200. The job execution command includes the result (process execution result) of the process executed by server 200 that receives the process execution instruction transmitted in step S32 in FIG. 12, in accordance with the process execution instruction, and the control identification information transmitted to server 200 in step S48 of the control information setting process shown in FIG. 13.

In step S62, it is determined whether control information exists. If the control information associated with the control identification information included in the received job execution command is stored in EEPROM 115, it is determined that control information exists. If control information exists, the process proceeds to step S63. If not, the process proceeds to step S69. In step S69, an error code is returned to server 200, and the process then ends.

In step S63, the control information is read out from EEPROM 115. Then, the process is executed in accordance with the process execution result included in the job execution command received in step S61 and the control information read out in step S63 (step S64). The process then proceeds to step S65. Here, the process execution result is text data obtained through character recognition of data specified by the file name, and the control information is a set value for printing. Therefore, an image of the text data that is the process result is formed in accordance with the set value in step S64.

In step S65, it is determined whether an error occurs during the process being executed in step S64. If an error occurs, the process proceeds to step S66. If not, the process proceeds to step S68. In step S66, an error screen is generated. Specifically, style sheet 115A associated with the application identification information received together with the job execution command in step S61 is read out from among style sheets 115A stored in EEPROM 115. Then, a structured document in which error information corresponding to the occurring error is written in a markup language is generated, and the second error display screen is generated which displays the structured document in accordance with the read style sheet 115A (step S66).

In the next step S67, the generated second error display screen is displayed on display portion 116A, and the process proceeds to step S68. In step S68, it is determined whether an end instruction is accepted. If an end instruction is accepted, the process ends. If not, the process returns to step S65. It is determined whether the process that starts being executed in step S64 is ended.

Figure 15:
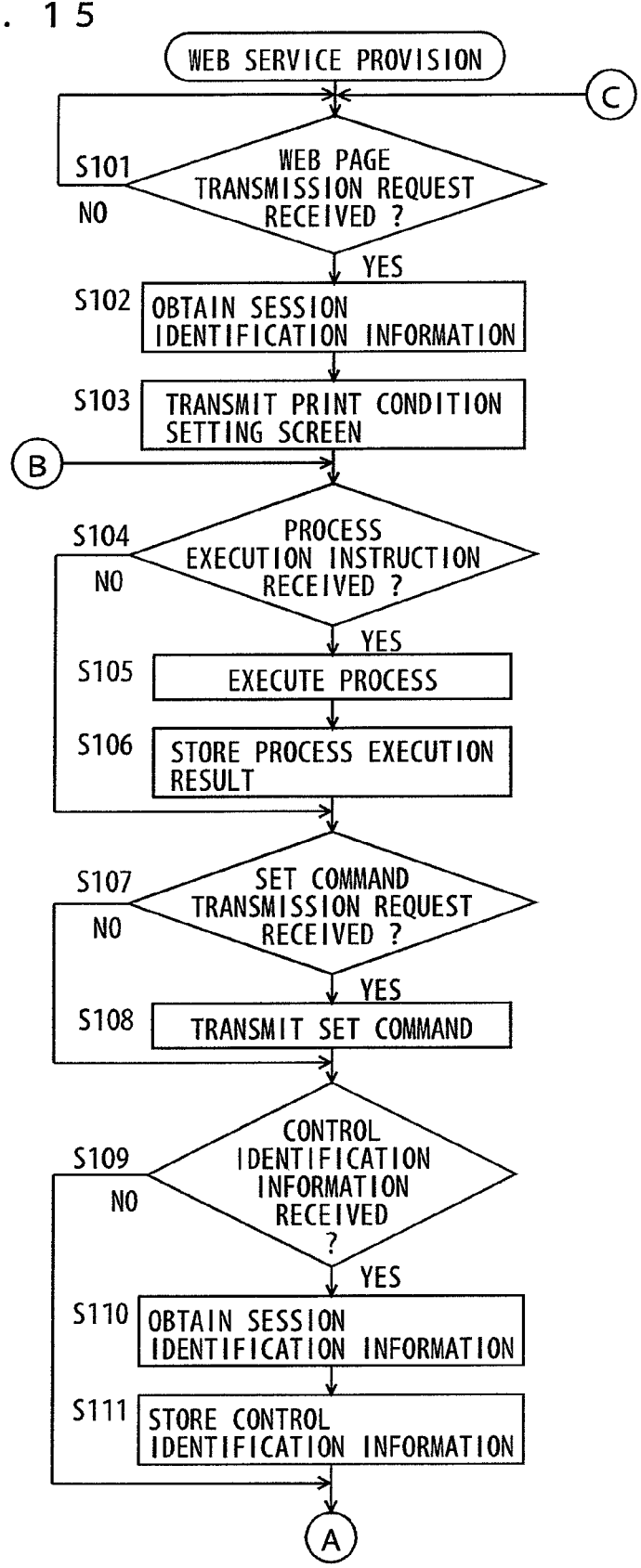
FIG. 15 is a first flowchart showing an exemplary flow of a Web service provision process.
Figure 16:
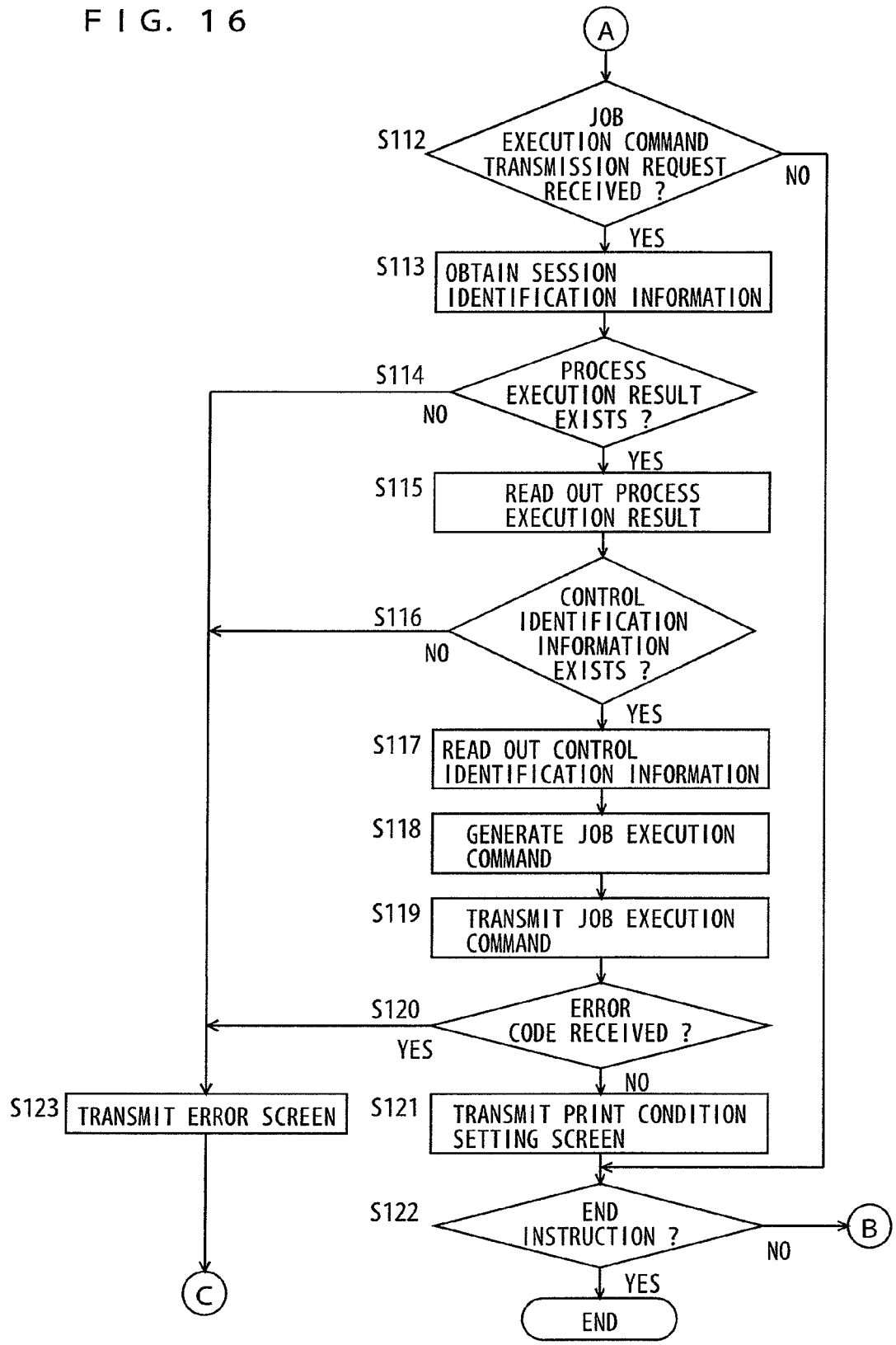
FIG. 16 is a second flowchart showing an exemplary flow of the Web service provision system.

FIG. 15 and FIG. 16 are flowcharts showing an exemplary flow of a Web service provision process. The Web service provision process is a process executed by CPU 201 of server 200 executing an application program. Referring to FIG. 15 and FIG. 16, CPU 201 determines whether a Web page transmission request is received (step S101). The process waits until network I/F 204 receives a Web page transmission request from one of MFP 100, 101, 102 (NO in step S101). If a Web page transmission request is received, the process proceeds to step S102. In other words, the process after step S102 is executed on condition that a Web page transmission request is received from one of MFP 100, 101, 102. Here, it is assumed that a Web page transmission request is received from MFP 100, by way of example.

In step S102, session identification information for identifying the communication session established with MFP 100 that has sent the Web page transmission request is obtained. The session identification information may be assigned by server 200. Then, in step S103, a Web page including print condition setting screen 300 shown in FIG. 6 is transmitted to MFP 100. Then, it is determined whether a process execution instruction is received (step S104). If a process execution instruction is received, the process proceeds to step S105. If not, the process proceeds to step S107. In step S105, the process is executed in accordance with the received process execution instruction. Then, the result of executing the process is temporarily stored (step S106). The process result is temporarily stored in association with the session identification information for identifying the communication session established with MFP 100 that has sent the process execution instruction in step S104. Here, the process execution instruction includes an instruction to execute the process of performing character recognition of the data specified by the file name. Therefore, the data specified by the file name is obtained and subjected to character recognition, and the text data obtained as a result of character recognition is temporarily stored as a process execution result.

In step S107, it is determined whether a set command transmission request is received. It is determined whether network I/F 204 receives a set command transmission request from MFP 100. If a set command transmission request is received, the process proceeds to step S108. If not, the process skips step S108 and proceeds to step S109. In step S108, the set command is transmitted to MFP 100 that has sent the set command transmission request. The application identification information for identifying the application program corresponding to the Web page of which transmission is requested in step S101, here, the application program for character recognition, is transmitted together with the set command.

In step S109, it is determined whether control identification information is received. It is determined whether network I/F 204 receives control identification information transmitted from MFP 100 that has sent the set command transmission request. If control identification information is received, the process proceeds to step S110. If not, the process proceeds to step S112. In step S110, the session identification information is obtained for identifying the communication session established with MFP 100 that has sent the control identification information. Then, the control identification information received in step S109 is associated with the session identification information and temporarily stored (step S111).

In the next step S112, it is determined whether a job execution command transmission request is received. It is determined whether network I/F 204 receives a job execution command transmission request transmitted from MFP 100. If a job execution command transmission request is received, the process proceeds to step S113. If not, the process proceeds to step S122. In step S113, the session identification information is obtained for identifying the communication session established with MFP 100 that has sent the job execution command transmission request.

Then, in the next step S114, it is determined whether there exists a process execution result paired with the session identification information obtained in step S113. It is determined whether a process execution result associated with the session identification information obtained in step S113 exists among the process execution results temporarily stored in step S106. If the process execution result exists, the process proceeds to step S115. If not, the process proceeds to step S123. In step S115, the process execution result associated with the session identification information obtained in step S113 is read out. The process then proceeds to step S116.

In step S116, it is determined whether there exists control identification information paired with the session identification information obtained in step S113. It is determined whether control identification information associated with the session identification information obtained in step S113 exists among the control identification information temporarily stored in step S111. If the control identification information exists, the process proceeds to step S117. If not, the process proceeds to step S123. In step S117, the control identification information associated with the session identification information obtained in step S113 is read out. The process then proceeds to step S118.

In step S118, a job execution command is generated which includes the process execution result read out in step S115 and the control identification information read out in step S117. Then, the generated job execution command is transmitted to MFP 100 that has sent the job execution command transmission request received in step S112, through network I/F 204 (step S119). The job execution command includes the process execution result and the control identification information received when the communication session having the same session identification information as the communication session established when the process execution instruction that produces the process execution result is received is established. Therefore, the result of the process that MFP 100 allows server 200 to execute is associated with the control information set in MFP 100, for each Web page including the print condition setting screen transmitted by server 200. Furthermore, the application identification information for identifying the application program corresponding to the application program of which transmission is requested in step S101, here, the application program for character recognition, is transmitted together with the job execution command.

In MFP 100 receiving the job execution command, the process is executed in accordance with the job execution command. However, for example, if the control information associated with the control identification information included in the job execution command is not stored, the execution of the process is failed. If the execution of the process is failed, an error code is transmitted.

In step S120, it is determined whether an error code is received from MFP 100 that has sent the job execution command. It is determined whether network I/F 204 receives an error code transmitted from MFP 100. If an error code is received, the process proceeds to step S123. If not, the process proceeds to step S121. In step S121, a Web page including the print condition setting screen is transmitted to MFP 100, and the process proceeds to step S122. In step S123, an error screen is transmitted, and the process then returns to step S101.

In step S122, it is determined whether an end instruction is detected. An end instruction is detected when it is detected that the communication session established with MFP 100 that has sent the Web page transmission request received in step S101 is cut off. If an end instruction is detected, the process ends. If not, the process returns to step S104.

In the foregoing second embodiment, the data processed in server 200 is processed in MFP 100. However, the present invention is applicable to the case where the data processed in MFP 100 is processed in server 200. This is the case, for example, when the process of scanning a document is performed by MFP 100 and the image data obtained by MFP 100 scanning a document is transmitted by email by server 200. In this case, referring to FIG. 9, the job execution command transmission request transmitted by job execution command transmission request portion 67A to server 200 requests transmission of a command to designate scanning of a document. Upon receiving the command to designate scanning of a document from server 200, command reception portion 79 outputs the file name of the scanned image data to identification information transmission portion 77 and also outputs to process execution portion 81 an instruction to scan a document and store the file name of the scanned image. Process execution portion 81 scans a document and stores the file name of the scanned image data into EEPROM 115. When receiving the process execution instruction from MFP 100, server 200 obtains the image data having the previously received file name and transmits the image data by email to the destination set by browsing portion 51. In this case, set command transmission request portion 65A is not necessary.

As described above, information processing system 1 in the first or second embodiment, MFP 100 receives a style sheet corresponding to an application program for executing character recognition from server 200. As a result of the execution of a print process in MFP 100, if an error such as paper out occurs and error information (display information) to notify the user is produced, the second display screen is displayed, in place of the first display screen including the error information, while the print condition setting screen received from server 200 is being displayed. The second display screen displays the second error display screen generated based on the error information and the style sheet received from server 200. The second error display screen is in the same style as the print condition setting screen received from server 200. Therefore, the error information output by MFP 100 can be displayed in the same style as the print condition setting screen received from server 200.

In information processing system 1 in the second embodiment, a browsing program is executed in MFP 100. When a file name is selected in print condition setting screen 300 transmitted from server 200, a process execution instruction is transmitted to server 200 to allow server 200 to execute the process for selecting a file name. The process is then executed in server 200 in accordance with the process execution instruction, and the process execution result, here, the file name included in the process execution instruction is stored. In this case, since a browsing program is executed in MFP 100, CPU 111 of MFP 100 cannot recognize that the file name has been selected, but the file name is recognized in server 200.

On the other hand, the control information such as a set value for printing is accepted in MFP 100 and is stored into EEPROM 115 in association with the control identification information. The control identification information is also transmitted to server 200. Even when MFP 100 has a plurality of functions, control information is set in MFP 100, so that a combination of set values that cannot be set in combination is not set.

Furthermore, on the part of MFP 100, when the job execution command including the process execution result and the control identification information is received from server 200, the process is executed based on the process execution result and the control information. Therefore, the process can be executed using the result of the process executed in server 200. Since MFP 100 has only to execute a browsing program, there is no need for developing or installing a special program.

On the other hand, on the part of the server, even when MFP 100, 101, 102 have different functions, there is no need for developing or installing a program corresponding to each of MFP 100, 101, 102, or there is no need for storing a prohibition rule table in which set values that cannot be set in combination are defined, corresponding to each of MFP 100, 101, 102.

In the foregoing first and second embodiments, information processing system 1 has been described. However, it is needless to say that the present invention can be understood as a cooperative job execution method for executing the Web application process shown in FIG. 7 and FIG. 8 or FIG. 12 to FIG. 14 or a cooperative job execution program for causing a computer to execute the cooperative job execution method, or as a job execution instruction method for executing the Web service provision process shown in FIG. 15 and FIG. 16 or a job execution instruction program for causing a computer to execute the job execution instruction method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing system comprising a server in which an application program is installed so as to be executable and an information processing apparatus which can communicate with said server, said server transmitting a setting screen for setting an execution condition for executing said application program in response to a request from said information processing apparatus, and executing said application program in accordance with the execution condition set in said setting screen in said information processing apparatus, said information processing apparatus including
an application registration portion set to allow said server to execute said application program,
a style sheet reception portion to receive a style sheet corresponding to said application program from said server,
a browsing portion to display a screen received from said server,
a process execution portion to execute a prescribed process, and
a display control portion, if said process execution portion produces error display information to notify a user as a result of executing said prescribed process, to display a first display screen including said error display information,
said display control portion including
a screen generation portion to generate a second display screen based on said error display information and said style sheet, if said error display information is produced, and displaying said second display screen in place of said first display screen while the screen received from said server is being displayed by said browsing portion,
a storage portion to store said second display screen without displaying said second display screen, if said produced error display information is predetermined specific information, and
a transmission portion to transmit identification information for identifying said stored second display screen to said server, and
said server transmits a screen in which a command including said identification information for displaying said second display screen is embedded, in response to reception of said identification information.

2. The information processing system according to claim 1, wherein, if a style sheet corresponding to said application program is not received from said server, said screen generation portion generates a second display screen in which said error display information is arranged based on said error display information and a default style sheet stored beforehand.

3. An information processing apparatus which can communicate with a server in which an application program is installed so as to be executable, comprising:
a browsing portion to display a screen received from said server,
if receiving from said server a setting screen for setting an execution condition for executing said application program, said browsing portion allowing said server to execute said application program in accordance with the execution condition set in said setting screen;
a style sheet reception portion to receive a style sheet corresponding to said application program from said server;
a process execution portion to execute a prescribed process;
a display control portion, if said process execution portion produces error display information to notify a user as a result of executing said prescribed process, to display a first display screen including said error display information; and
a screen generation portion to generate a second display screen based on said error display information and said style sheet, if said error display information is produced, wherein, while the screen received from said server is being displayed by said browsing portion, said display control portion displays said second display screen in place of said first display screen;

said display control portion includes
a storage portion to store said second display screen without displaying said second display screen, if said produced error display information is predetermined specific information, and
a transmission portion to transmit identification information for identifying said stored second display screen to said server, and
said browsing portion receives and displays a screen in which a command including said identification information for displaying said second display screen is embedded, from said server receiving said identification information.

4. The information processing apparatus according to claim 3, wherein, if a style sheet corresponding to said application program is not received from said server, said screen generation portion generates a second display screen based on said error display information and a default style sheet stored beforehand.

5. A cooperative job execution method executed in an information processing apparatus which can communicate with a server in which an application program is installed so as to be executable, comprising:
a browsing step of displaying a screen received from said server,
said browsing step including
a step of receiving a setting screen for setting an execution condition for executing said application program from said server and
a step of allowing said server to execute said application program in accordance with the execution condition set in said setting screen;
a step of receiving a style sheet corresponding to said application program from said server;
a step of executing a prescribed process;
a step of, if error display information to notify a user is produced as a result of execution of said prescribed process while the screen received from said server is not being displayed, displaying a first display screen including said error display information;
a step of, if error display information to notify the user is produced as a result of execution of said prescribed process, generating a second display screen based on said error display information and said style sheet;
a step of, if error display information to notify a user is produced as a result of execution of said prescribed process while the screen received from said server is being displayed, displaying said second display screen;
a step of prohibiting display of said second display screen and storing said second display screen, if said produced error display information is predetermined specific information; and
a step of transmitting identification information for identifying said stored second display screen to said server,
wherein said browsing step includes a step of receiving and displaying a screen in which a command including said identification information for displaying said second display screen is embedded, from said server receiving said identification information.

6. The cooperative job execution method according to claim 5, wherein said step of generating a second display screen includes a step of generating said second display screen based on said error display information and a predetermined default style sheet, if a style sheet corresponding to said application program is not received from said server in said step of receiving.

7. A non-transitory computer-readable recording medium encoded with a cooperative job execution program which can communicate with a server in which an application program is installed and causing a computer to execute processing, comprising:

a browsing step of displaying a screen received from said server, said browsing step including a step of receiving a setting screen for setting an execution condition for executing said application program from said server and a step of allowing said server to execute said application program in accordance with the execution condition set in said setting screen;

a step of receiving a style sheet corresponding to said application program from said server;

a step of executing a prescribed process;

a step of, if error display information to notify a user is produced as a result of execution of said prescribed process while the screen received from said server is not being displayed, displaying a first display screen including said error display information;

a step of, if error display information to notify the user is produced as a result of execution of said prescribed process, generating a second display screen based on said error display information and said style sheet, and a step of, if error display information to notify a user is produced as a result of execution of said prescribed process while the screen received from said server is being displayed, displaying said second display screen;

a step of prohibiting of said second display screen and storing said second display screen, if said produced error display information is predetermined specific information; and a step of transmitting identification information for identifying said stored second display screen to said server, wherein said browsing step includes a step of receiving and displaying a screen in which a command including said identification information for displaying said second display screen is embedded, from said server receiving said identification information.

8. The non-transitory computer-readable recording medium according to claim 7, wherein said step of generating a second display screen includes a step of generating said second display screen based on said error display information and a predetermined default style sheet, if a style sheet corresponding to said application program is not received from said server in said step of receiving.

* * * * *